(12) United States Patent
Xiao et al.

(10) Patent No.: US 10,530,633 B2
(45) Date of Patent: Jan. 7, 2020

(54) LINK DETECTION METHOD, APPARATUS, NETWORK DEVICE, AND CONTROLLER

(71) Applicant: Alibaba Group Holding Limited, Grand Cayman (KY)

(72) Inventors: Hongliang Xiao, Zhejiang (CN); Dacheng Zhang, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/022,576

(22) Filed: Jun. 28, 2018

(65) Prior Publication Data

US 2018/0309617 A1 Oct. 25, 2018

Related U.S. Application Data

(63) Continuation of application No. PCT/CN2016/110257, filed on Dec. 16, 2016.

(30) Foreign Application Priority Data

Dec. 30, 2015 (CN) .......................... 2015 1 1022938

(51) Int. Cl.
*H04L 12/24* (2006.01)
*H04L 12/703* (2013.01)
(Continued)

(52) U.S. Cl.
CPC ...... *H04L 41/0654* (2013.01); *H04L 12/4633* (2013.01); *H04L 12/4641* (2013.01);
(Continued)

(58) Field of Classification Search
CPC ............. H04L 12/4633; H04L 12/4641; H04L 41/0677; H04L 41/12; H04L 43/0811; H04L 61/2007
See application file for complete search history.

(56) References Cited

U.S. PATENT DOCUMENTS

| 7,009,980 B1* | 3/2006 | Cao ..................... H04Q 11/0478 370/216 |
| 2003/0167348 A1* | 9/2003 | Greenblat ............... H04L 12/42 709/251 |

(Continued)

FOREIGN PATENT DOCUMENTS

| CN | 101616094 A | 12/2009 |
| CN | 104270298 A | 1/2015 |

(Continued)

OTHER PUBLICATIONS

Translation of the International Search Report from corresponding PCT Application No. PCT/CN2016/110257, dated Mar. 15, 2017, 2 pages.

(Continued)

*Primary Examiner* — Ayaz R Sheikh
*Assistant Examiner* — Debebe A Asefa
(74) *Attorney, Agent, or Firm* — Lee & Hayes, P.C.

(57) ABSTRACT

Link detection method, apparatus, network device and controller are provided. The method includes sequentially sending a detection message from a starting network device to each network device up to an ending network device on a detected link, the detection message including a source IP address and a destination IP address on the detected link, and an identifier of the detection message; receiving link status information reported by a network device on the detected link, the link status information including the source IP address, the destination IP address, a device IP address of the network device, and the identifier; and performing a matching between the detection message and the detected link based on the source IP address, the destination IP address and the identifier included in the link status information, and locating a network position of the network device on the detected link based on the device IP address.

20 Claims, 16 Drawing Sheets

(51) Int. Cl.
    *H04L 12/46* (2006.01)
    *H04L 29/12* (2006.01)
(52) U.S. Cl.
    CPC .............. *H04L 41/12* (2013.01); *H04L 45/28* (2013.01); *H04L 61/2007* (2013.01)

(56) References Cited

U.S. PATENT DOCUMENTS

| | | |
|---|---|---|
| 2011/0317969 A1 | 12/2011 | Dangel et al. |
| 2013/0322453 A1* | 12/2013 | Allan ................. H04L 12/4662 370/395.53 |
| 2015/0281062 A1 | 10/2015 | Duda et al. |

FOREIGN PATENT DOCUMENTS

| | | |
|---|---|---|
| CN | 104660469 A | 5/2015 |
| EP | 3355532 A1 | 8/2018 |

OTHER PUBLICATIONS

Translation of Written Opinion from corresponding PCT Application No. PCT/CN2016/110257, dated Mar. 15, 2017, 3 pages.

The Extended European Search Report dated May 20, 2019 for European Patent Application No. 16880971.3, 13 pages.

Pang et al, "Path Detections in VXLAN Overlay Network", Internet Engineering Task Force (IETF), rue de falaises ch. , Geneva, Switzerland, Oct. 19, 2015, pp. 1-16.

Machine translation of first Chinese office action dated Jul. 1, 2019 for Chinese patent application No. 201511022938.4, a foreign counterpart application of U.S. Appl. No. 16/022,576, 34 pages.

* cited by examiner

```
0 1 2 3 4 5 6 7 8 9 0 1 2 3 4 5
+-+-+-+-+-+-+-+-+-+-+-+-+-+-+-+-+
|                                |
-     MAC header of outer layer  -    14 bytes
|                                |
+-+-+-+-+-+-+-+-+-+-+-+-+-+-+-+-+
|                                |
-     IP header of inner layer   -    20 bytes
|                                |
+-+-+-+-+-+-+-+-+-+-+-+-+-+-+-+-+
|     UDP header of outer layer  |    8 bytes
+-+-+-+-+-+-+-+-+-+-+-+-+-+-+-+-+
|     VXLAN header               |    8 bytes
+-+-+-+-+-+-+-+-+-+-+-+-+-+-+-+-+
|                                |
-     Message of inner layer     ~    variable
|                                |
+-+-+-+-+-+-+-+-+-+-+-+-+-+-+-+-+
```

FIG. 8B

```
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|R|R|R|R|I|R|R|R|          Reserved fields                     |
+-+-+-+-+-+-+-+-+-+-+-+-+-+-+-+-+-+-+-+-+-+-+-+-+-+-+-+-+-+-+-+-+
VXLAN network identifier (VNI) |R|R|R|R|R|R|R|PD|
+-+-+-+-+-+-+-+-+-+-+-+-+-+-+-+-+-+-+-+-+-+-+-+-+-+-+-+-+-+-+-+-+
```

FIG. 8C

LINK DETECTION METHOD, APPARATUS, NETWORK DEVICE, AND CONTROLLER

CROSS REFERENCE TO RELATED PATENT APPLICATIONS

This application claims priority to and is a continuation of PCT Patent Application No. PCT/CN2016/110257 filed on 16 Dec. 2016, and is related to and claims priority to Chinese Patent Application No. 201511022938.4, filed on 30 Dec. 2015, entitled "Link Detection Method, Apparatus, Network Device, and Controller," which are hereby incorporated by reference in their entirety.

TECHNICAL FIELD

The present disclosure relates to the technical field of communications, and particularly to link detection methods, apparatuses, network devices, and controllers.

BACKGROUND

In a VXLAN network, multiple equal-cost paths may exist between two VXLAN tunnel end points (VTEP) for load sharing. When a failure occurs in a certain link in the multiple equal-cost paths, the failed link needs to be detected quickly to prevent the traffic from being sent to this failed link. In existing technologies, in order to detect multiple equal-cost paths that may exist among links, a starting point VTEP sequentially increases a source port in a UDP header of an outer layer of an encapsulated detection message by one according to an order of the message, with a purpose of traversing all paths. In a situation in which multiple equal-cost paths that are cascading exist (for example, a node A has two equal-cost paths to a node B and a node C individually, the node B also has two equal-cost paths to a node D and a node E individually, and hash path selection algorithms of the node A and the node B both include source ports), the node A may transmit detection messages having source ports as odd numbers (source and destination IPs remain unchanged) to the node B, and transmit detection messages having source ports as even numbers to the node C, while the node B transmits detection message having source ports as odd numbers to the node C. Therefore, no detection message pass through a link from the node B to the node D. As can be seen, the existing technologies depend largely on hash path selection algorithms of node devices, and cannot ensure that all paths are traversed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In order to achieve the above goals, the present disclosure provides technical solutions as follows.

In implementations, a link detection method is proposed, and is applied in a controller. The method includes sequentially sending a detection message from a starting network device to each network device until an ending network device on a detected link, the detection message including a first source IP address and a first destination IP address on the detected link, and a first identifier of the detection message; receiving link status information reported by a network device on the detected link in response to the detection message, the link status information including the first source IP address, the first destination IP address, a device IP address of the network device, and the first identifier; and performing a matching between the detection message and the detected link based on the first source IP address, the first destination IP address and the first identifier included in the link status information, and locating a network position on the detected link in which the network device is located based on the device IP address.

In implementations, a link detection method is proposed, and is applied in a network device. The method includes determining whether a received network message is a detection message; if the network message is a detection message, generating link status information based on a first source IP address and a first destination IP address included in the detection message, a device IP address of the network device, and a first identifier of the detection message, and reporting the link status information to a controller; parsing a destination VTEP address from the detection message, searching a forwarding table of the network device based on the destination VTEP address, and replicating the detection message according to a number of at least one next jump of the network device if the at least one next jump exists in the forwarding table; and encapsulating a MAC header of the detection message based on a MAC address of each next jump of the at least one next jump, and transmitting the detection message to the at least one next jump.

In implementations, a link detection apparatus is proposed, and is applied in a controller. The apparatus includes a first sending module used for sequentially sending a detection message from a starting network device to each network device until an ending network device on a detected link, the detection message including a first source IP address and a first destination IP address on the detected link, and a first identifier of the detection message; a first receiving module used for receiving link status information reported by a network device on the detected link in response to the detection message that is sent by the first sending module, the link status information including the first source IP address, the first destination IP address, a device IP address of the network device, and the first identifier; and a matching module used for performing a matching between the detection message and the detected link based on the first source IP address, the first destination IP address and the first identifier included in the link status information that is received by the first receiving module, and locating a network position on the detected link in which the network device is located based on the device IP address.

In implementations, a link detection apparatus is proposed, and is applied in a network device. The apparatus includes a fourth determination module used for determining whether a received network message is a detection message; a link information generation module used for, if the fourth determination module determines that the network message is a detection message, generating link status information based on a first source IP address and a first destination IP address included in the detection message, a device IP address of the network device, and a first identifier of the detection message, and reporting the link status information to a controller; a searching module used for parsing a destination VTEP address from the detection message that is determined by the fourth determination module, searching a forwarding table of the network device based on the destination VTEP address, and replicating the detection message according to a number of at least one next jump of the network device if the at least one next jump exists in the forwarding table; and a first encapsulation module used for encapsulating a MAC header of the detection message based on a MAC address of each next jump of the at least one next jump that is found by the searching module, and transmitting the detection message to the at least one next jump.

In implementations, a controller is proposed. The controller includes a first processor, a first storage device storing instructions executable by the first processor, and a first network interface, wherein the first network interface is used for sequentially sending a detection message from a starting network device to each network device until an ending network device on a detected link, the detection message including a first source IP address and a first destination IP address on the detected link, and a first identifier of the detection message; and receiving link status information reported by a network device on the detected link in response to the detection message, the link status information including the first source IP address, the first destination IP address, a device IP address of the network device, and the first identifier; and the first processor is used for performing a matching between the detection message and the detected link based on the first source IP address, the first destination IP address and the first identifier included in the link status information, and locating a network position on the detected link in which the network device is located based on the device IP address.

In implementations, a network device is proposed. The network device includes a second processor, a storage device storing instructions executable by the second processor, and a second network interface, wherein the second processor is used for determining whether a received network message is a detection message; generating link status information based on a first source IP address and a first destination IP address included in the detection message, a device IP address of the network device, and a first identifier of the detection message, and reporting the link status information to a controller through the second interface, if the network message is a detection message; searching a forwarding table of the network device based on the first destination IP address, and replicating the detection message according to a number of at least one next jump of the network device if the at least one next jump exists in the forwarding table; and encapsulating a MAC header of the detection message based on a MAC address of each next jump of the at least one next jump, and transmitting the detection message to the at least one next jump through the second interface.

As can be seen from the technical solutions, the present disclosure can traverse all paths in a detected link and enable a controller to know link status information of all links on the detected link, thus helping to quickly identify and locate a failed link.

BRIEF DESCRIPTION OF THE DRAWINGS

FIG. 8B is an exemplary format of a detection message as described with reference to FIG. 8A.

FIG. 8C is an exemplary format of a VXLAN header as described with reference to FIG. 8A.

DETAILED DESCRIPTION

The exemplary embodiments are described in detail herein, with examples thereof being represented in the accompanying drawings. When the accompanying drawings are involved in the following description, the same numerals in different accompanying drawings represent the same or similar elements, unless stated otherwise. Implementations described in the following exemplary embodiments are not representative of all implementations that are consistent with the present disclosure, but rather are merely examples of apparatuses and methods that are consistent with the present disclosure and described in the appended claims in detail.

Terminologies used in the present disclosure are merely used for the purpose of describing specific embodiments, and are not intended to limit the present disclosure. Singular forms such as "a", "said" and "the" used in the present disclosure and the appended claims are intended to include plural forms. Unless other meanings are clearly indicated in the context, it should also be understood that a phrase "and/or" used in the present specification is referred to any or all possible combinations of one or more associated items that are listed.

Although the present disclosure may use terms such as first, second, third, etc., to describe various pieces of information, it should be understood that these pieces of information should not be limited to these terms. These terms are merely used for distinguishing information of a same type. For example, without departing the scope of the present disclosure, a first piece of information can also be called as a second piece of information. Similarly, a second piece of information can also be called as a first piece of information. Depending on the context, a term "if" that is used therein can be interpreted as "at the time when", "when", or "in response to determining that".

Figure 1:
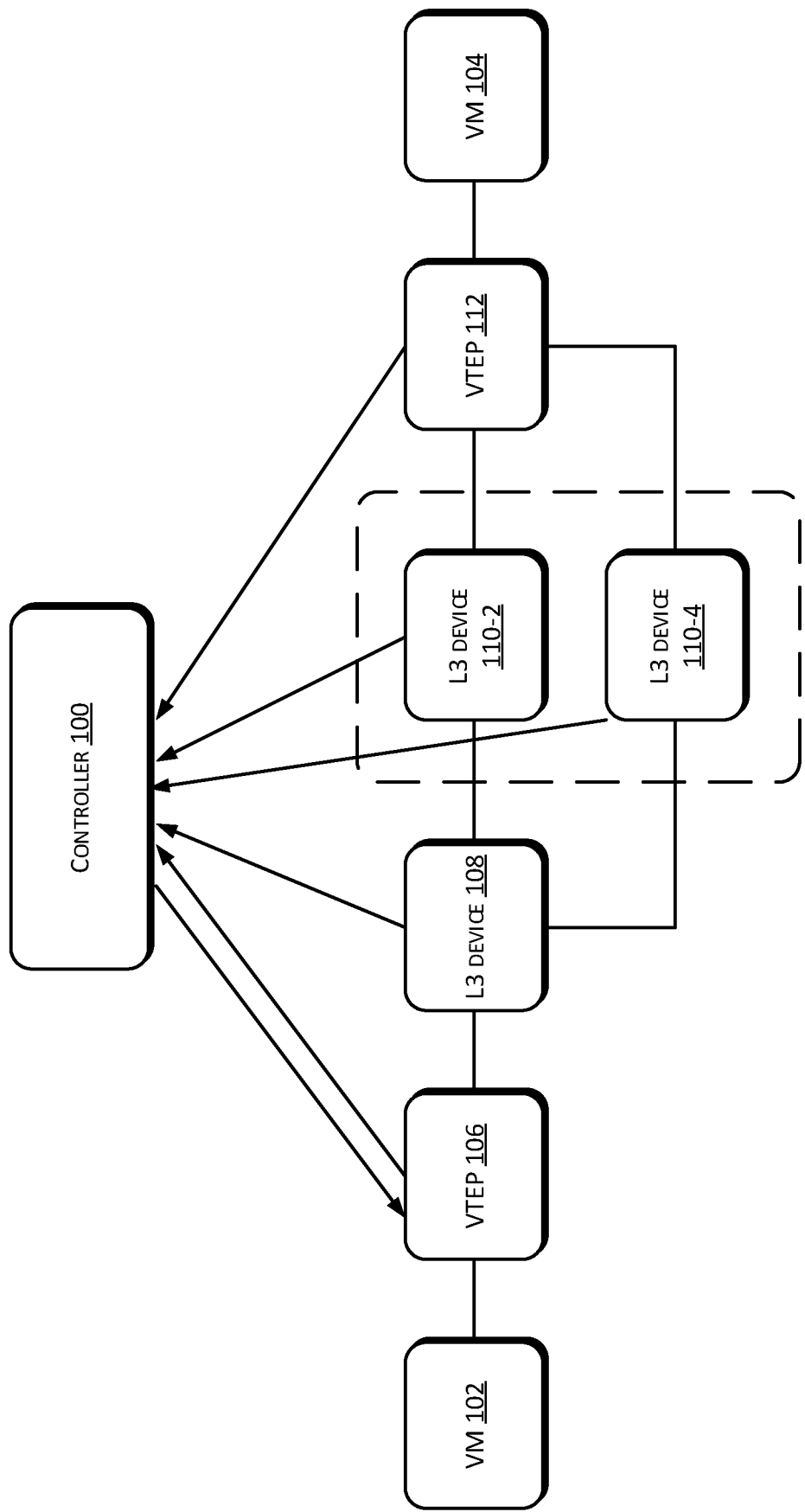
FIG. 1 is a framework diagram of a network suitable for exemplary embodiments in accordance with the present disclosure.

FIG. 1 is a framework diagram of a network suitable for the exemplary embodiments of the present disclosure. When a management person chooses to perform a link detection between a virtual machine (which is abbreviated as VM) 102 and VM104 through a controller 100, the controller 100 can retrieve IP addresses of VM102 and VM104, set an IP address of VM102 as a first source IP address, set an IP address of VM104 as a first destination IP address, generate a first identifier (ID) that is used for identifying a detection message, and create the detection message based on the first source IP address, the first destination IP address and the first identifier. The controller 100 sends the detection message to a starting point VTEP106. After the detection message is sequentially forwarded by a L3 device 108, a L3 device 110-2 and a L3 device 110-4, the detection message arrives at an ending point VTEP112. The starting point VTEP106, the L3 device 108, the L3 device 110-2, the L3 device 110-4 and the ending point VTEP112 report respective link status information to the controller 100 upon receiving the detection message. The controller 100 records link status information reported by each device. In implementations, the controller 100 can be a software defined network (which is abbreviated as SDN) controller. If a forwarding table of a starting point or a certain network intermediate node of a link has multiple equal-cost paths, the detection message is replicated according to a number of next jumps, and forwarded to corresponding paths. For example, the L3 device 108 as shown in FIG. 1 has two equal-cost paths for next jumps (the L3 device 110-2 and the L3 device 110-4). The L3 device 108 may replicate the detection message, and then send thereof to the L3 device 110-2 and the L3 device 110-4. As such, the present disclosure can manage and maintain a link through a controller, and can traverse all paths of the link, thus solving the deficiency of the existing technologies that fails to traverse all paths on a link.

In order to describe the present disclosure in further detail, the following embodiments are provided.

Figure 2:
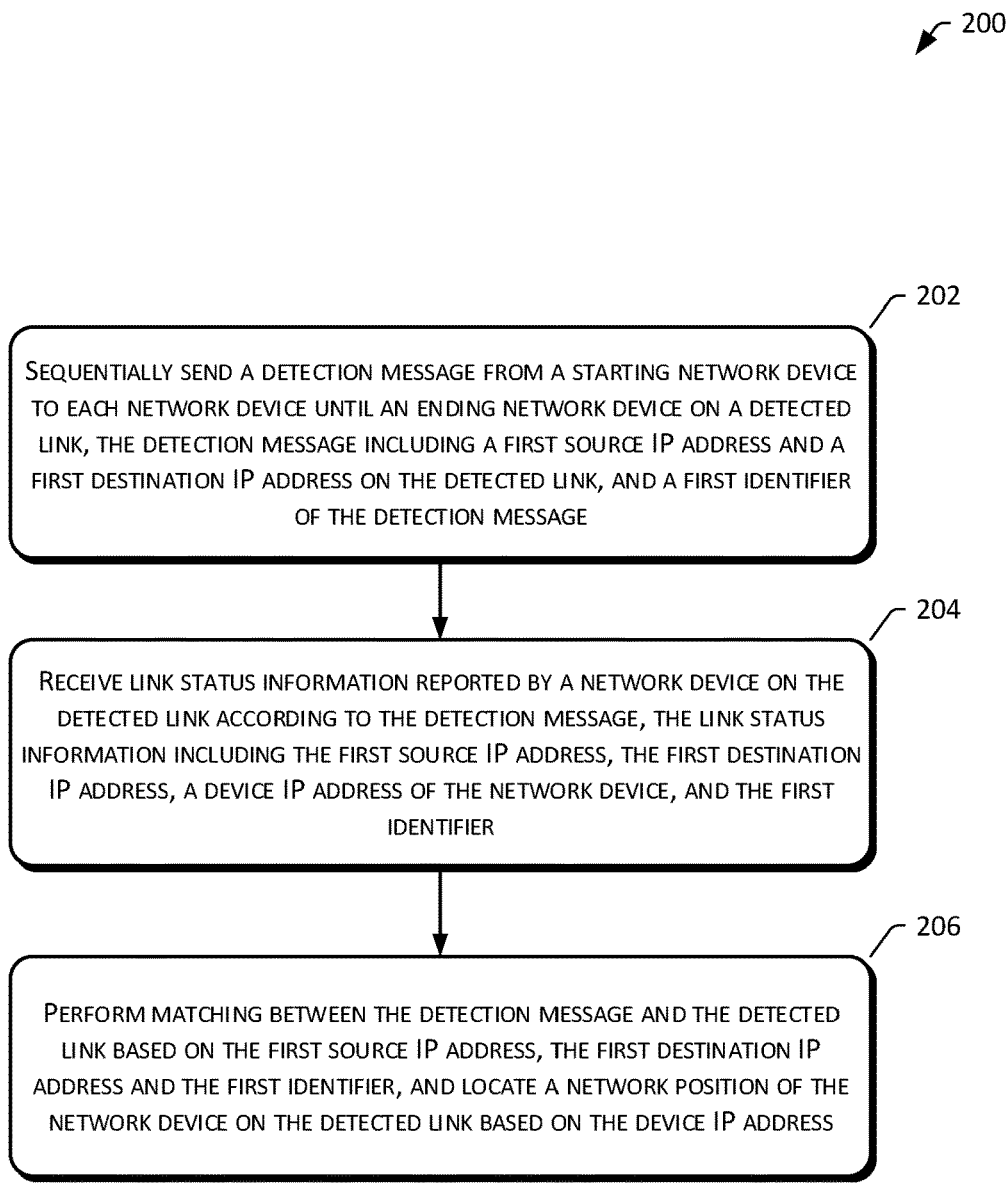
FIG. 2 is a flowchart of a link detection method in accordance with a first exemplary embodiment of the present disclosure.

FIG. 2 is a flowchart of a link detection method 200 in accordance with a first exemplary embodiment of the present disclosure, which can be applied in the controller 100 as shown in FIG. 1. The present embodiment is described and illustrated in conjunction with the embodiment shown in FIG. 1. As shown in FIG. 2, the following operations are included.

Operation 202 sequentially sends a detection message from a starting network device to each network device until an ending network device on a detected link, the detection message including a first source IP address and a first destination IP address on the detected link, and a first identifier of the detection message.

In implementations, the detected link may be selected by a network management person. As shown in FIG. 1, the controller 100 retrieves IP addresses of two ends (e.g., VM102 and VM104) of the detected link, sets an IP address of one end (e.g., VM102) of the detected link as a first source IP address, and sets an IP address of another end (e.g., VM104) as a first destination IP address. In implementations, a first identifier may be generated by means of assignment of sequential numbers to detection messages. Within a defined period for performing a link detection of a detected link (a range of the defined period is between ten mini-seconds and one second), the controller 100 can send a detection message to VTEP106 intermittently, and sequentially increases a first identifier by one, i.e., ID+1, until the detection period is ended. Increasing a first identifier of a detection message by one can ensure the uniqueness of IDs of detection messages on a same detected link, and can allow the controller 100 to perform matching of link status information reported by network devices on the detected link conveniently. By counting the number of detection messages on the same detected link, the controller 100 can be allowed to calculate the number of detection messages that are sent on the detected link.

In implementations, as shown in FIG. 1, upon receiving a detection message, the VTEP106 can look up a corresponding forwarding table based on a first destination IP address of the detection message, and perform VXLAN encapsulation on the detection message based on information in the forwarding table such as a destination VNI and a destination VTEP address. A PD flag bit in a VXLAN header is set to be one at the same time to enable a network device to identify whether a received network message is a detection message based on a PD flag. Content of the VXLAN header of the detection message after VXLAN encapsulation can be referenced to a message format that is described in the following description. In implementations, VTEP106 can search for a next jump based on a destination VTEP address, and determine whether the detection message is needed to be replicated and the number of replications of the detection message that are needed based on a number of next jumps. If only one next jump exists, the detection message can be directly forwarded to the next jump of the VTEP106 after encapsulating a MAC header of the detection message. If multiple equal-cost next jumps exist, the detection message that has undergone the VXLAN encapsulation is replicated according to the number of the next jumps. A MAC header of a respective detection message is encapsulated according to a MAC address of each next jump, and the encapsulated detection messages are sent to the corresponding next jumps of VTEP106.

For example, after receiving the detection message, the L3 device 108, which is the next jump of VTEP106, reports link status information to the controller 100. The link status information may include a device IP address of the L3 device 108. As such, the controller 100 is enabled to identify the network device from which the detection message comes using the device IP address. The L3 device 108 searches for a next jump based on the destination VTEP address in the detection message, determine whether the detection message is needed to be replicated and the number of replications of the detection message that are needed based on a number of next jumps. If only one next jump exists, the detection message can be directly forwarded to the next jump after encapsulating a MAC header of the detection message. If multiple equal-cost next jumps exist (such as the L3 device 110-2 and the L3 device 110-4 as shown in FIG. 1), the detection message is replicated according to the number of the next jumps. The L3 device 110-2 and the L3 device 110-4 perform the same operations of the L3 device 108, until the detection message is forwarded to the ending network device VTEP112.

Operation 204 receives link status information reported by a network device on the detected link according to the detection message, the link status information including the first source IP address, the first destination IP address, a device IP address of the network device, and the first identifier.

Operation 206 performs matching between the detection message and the detected link based on the first source IP address, the first destination IP address and the first identifier, and locates a network position of the network device on the detected link based on the device IP address.

As shown in FIG. 1, in implementations, the controller 100 receives respective link status information reported by a network device (the L3 device 108) at operation 206. The controller 100 can extract information of the link status information such as the first source IP address, the first destination IP address, the device IP address of the L3 device 108, and the first identifier of the detection message, from the received link status information. Based on the first source IP address, the first destination IP address and the first identifier of the detection message in the link status information, the corresponding detected link is found. A network position of the L3 device 108 on the detected link is located based on the device IP address. In implementations, the controller 100 may also record the link status information into a corresponding node of a topological structural map that is maintained by the controller 100, thus facilitating the management person to view link statuses on the entire detected link.

As can be seen from the above description, the embodiments of the present disclosure can traverse all paths on a detected link through the operations 202-206, and enable a controller to know link status information of all the paths on the detected link to help identifying and locating a failed link quickly.

Figure 3:
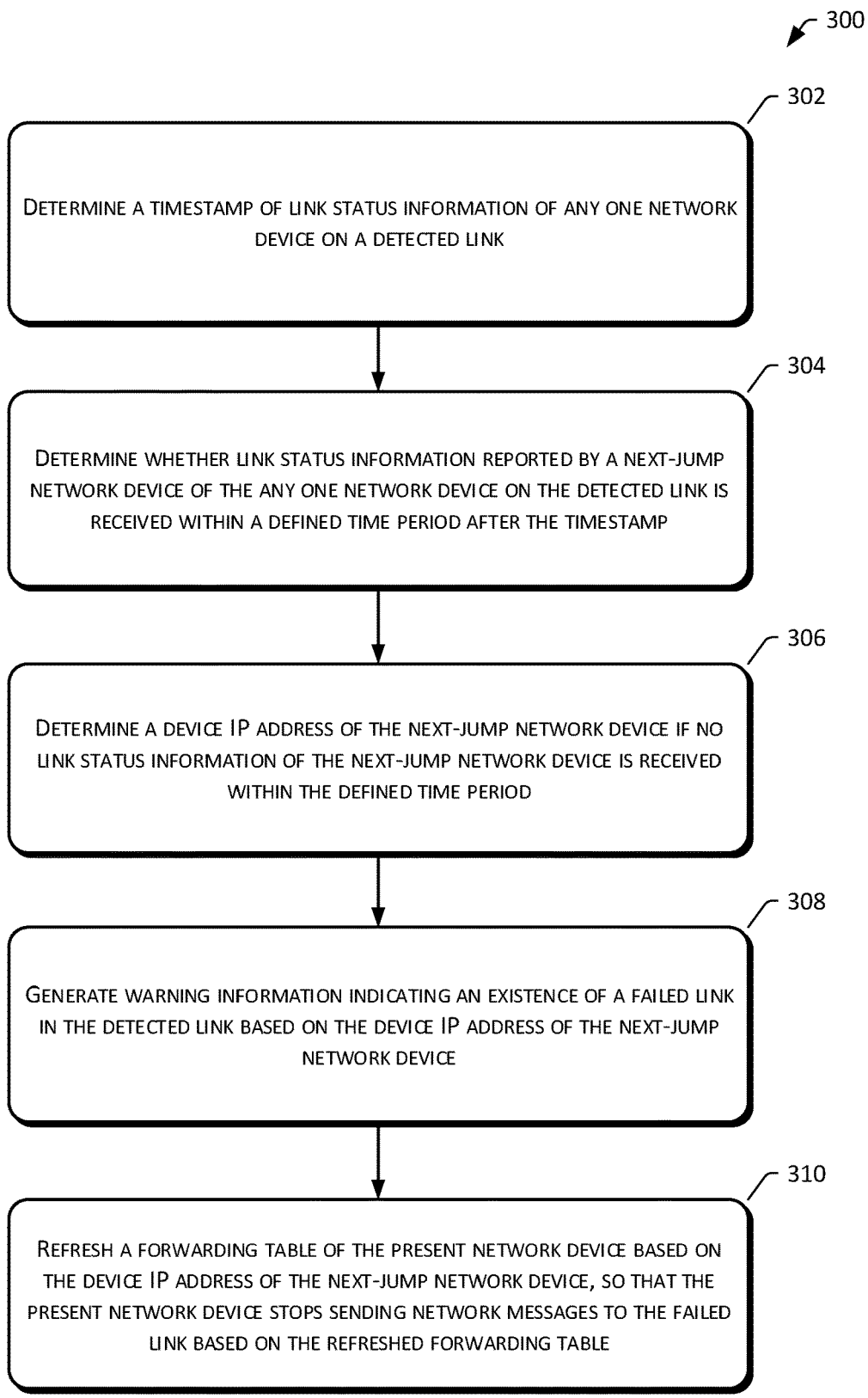
FIG. 3 is a flowchart of a link detection method in accordance with a second exemplary embodiment of the present disclosure.

FIG. 3 is a flowchart of a link detection method 200 in accordance with a second exemplary embodiment of the present disclosure. The present embodiment uses an example of how to determine a failed link using link status information after a controller receives the link status information on a detected link as an illustrative description. As shown in FIG. 3, the following operations are included.

Operation 302 determines a timestamp of link status information of any one network device on a detected link.

Operation 304 determines whether link status information reported by a next-jump network device of the any one network device on the detected link is received within a defined time period after the timestamp.

Operation 306 determines a device IP address of the next-jump network device if no link status information of the next-jump network device is received within the defined time period.

Operation 308 generates warning information indicating an existence of a failed link in the detected link based on the device IP address of the next-jump network device.

Operation 310 refreshes a forwarding table of the present network device based on the device IP address of the next-jump network device, so that the present network device stops sending network messages to the failed link based on the refreshed forwarding table.

As shown in FIG. 1, after receiving link status information that is reported by any one network device on a detected link, the controller 100 can also extract information, such as a timestamp of the network device when a detection message is received, a device IP address of the network device, an entry port of the detection message, a first source IP address, a first destination IP address, and a first identifier of the detection message, from the link status information. For example, after receiving link status information reported by the L3 device 108 (the present network device in the present disclosure), the controller 100 extracts a timestamp at which the L3 device 108 receives a detection message from the link status information. If no link status information that is reported by the L3 device 110-4 is received within a continuous time period after the timestamp, the controller 100 determines a device IP address of the L3 device 110-4, and generates warning information indicating an existence of a failed link in the detected link based on the device IP address of the L3 device 110-4. The management person is therefore able to know that a link between the L3 device 108 and the L3 device 110-4 has failed. The controller 100 may further refresh a forwarding table of the L3 device 108, so that the L3 device 108 can be prevented from sending the traffic onto the failed link between the L3 device 108 and the L3 device 110-4.

The present embodiment can enable a management person to know a failed link between two adjacent network devices on top of the beneficial effects of the foregoing embodiment, and avoid a network device from sending the traffic to the failed link, thus improving the efficiency of traffic forwarding of the network device.

Figure 4:
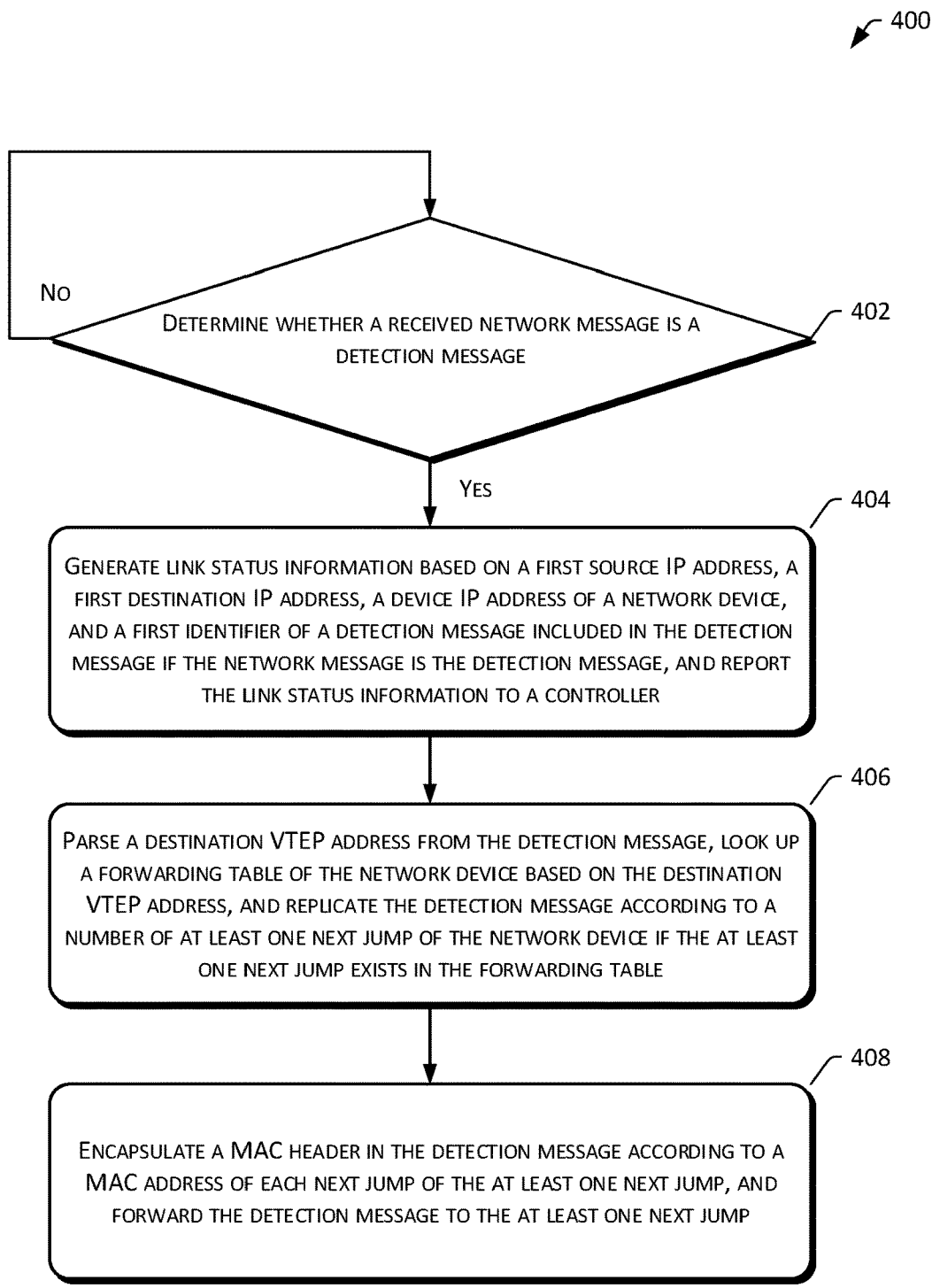
FIG. 4 is a flowchart of a link detection method in accordance with a third exemplary embodiment of the present disclosure.

FIG. 4 is a flowchart of a link detection method 400 in accordance with a third exemplary embodiment of the present disclosure. The present embodiment is illustrated and described in conjunction with FIG. 1. As shown in FIG. 4, the following operations are included.

Operation 402 determines whether a received network message is a detection message. Operation 404 is performed if the network message is a detection message. If the network message is an ordinary network message, operation 402 is performed again.

In implementations, VXLAN encapsulation may be performed for a detection message that is generated by the controller 100. By performing VXLAN encapsulation for a detection message that is generated by the controller 100, the detection message can be forwarded by network devices in a VXLAN network. In implementations, a determination of whether a network message is a detection message can be performed using a PD flag in a VXLAN encapsulated detection message. For example, a PD flag being one indicates that an associated network message is a detection message, and a PD flag being zero indicates that an associated network message is an ordinary network message.

Operation 404 generates link status information based on a first source IP address, a first destination IP address, a device IP address of a network device, and a first identifier of a detection message included in the detection message if the network message is the detection message, and reports the link status information to a controller.

In implementations, a network device can extract a first source IP address and a first destination IP address on a detected link from an inner message of a detection message, set a device IP address of the network device as a second source IP address, and set an IP address of a controller as a second destination IP address. The network device reports link status information to the controller. The first source IP address and the first destination IP address are information of an inner layer in the detection message, and are a portion of load. The second source IP address is a real source IP address of the link status information. The second destination IP address is a real destination IP of the link status information, and is information in an IP header of an outer layer in a detection message format that will be described in the following.

Operation 406 parses a destination VTEP address from the detection message, looks up a forwarding table of the network device based on the destination VTEP address, and replicates the detection message according to a number of at least one next jump of the network device if the at least one next jump exists in the forwarding table.

In implementations, the destination VTEP address is encapsulated as a destination IP address of an outer layer of the detection message by a starting network device on the detected link. In implementations, the number of the at least one next jump can be determined from the number of exit ports.

Operation 408 encapsulates a MAC header in the detection message according to a MAC address of each next jump of the at least one next jump, and forwards the detection message to the at least one next jump.

In implementations, an example of encapsulating a MAC header in a detection message using a MAC address can be referenced to a detection message format that will be described in the following, and is not described in detail herein first.

Through the above operations 402-408, the embodiments of the present disclosure can enable a present network device to replicate a detection message that comes from a controller according to a number of at least one next jump, and ensure that the detection message can be sent to all paths on a detected link, thereby achieving a traversal of all the paths on the detected link. This enables the controller to know link status information of all links on the detected link, and facilitates the controller to maintain the link based on the link status information.

Figure 5:
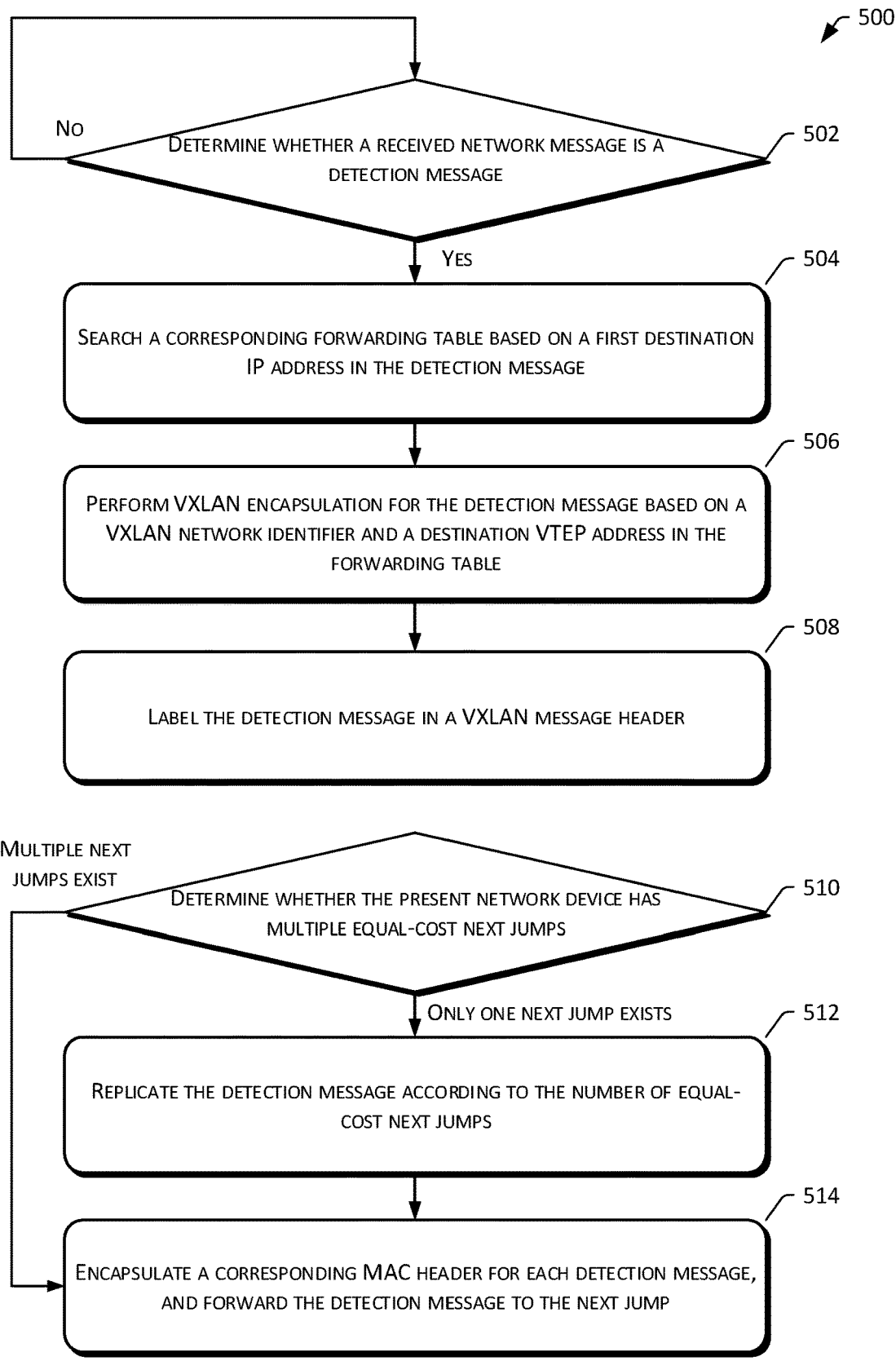
FIG. 5 is a flowchart of a link detection method in accordance with a fourth exemplary embodiment of the present disclosure.

FIG. 5 is a flowchart of a link detection method 500 in accordance with a fourth exemplary embodiment of the present disclosure. The present embodiment is illustrated and described in conjunction with FIG. 1 and an example of implementing detection message forwarding by VTEP106. As shown in FIG. 5, the following operations are included.

Operation 502 determines whether a received network message is a detection message. Operation 504 is performed if the network message is a detection message. If the network message is an ordinary network message, operation 502 is performed again.

Detailed description of operation 502 can be referenced to the description of operation 402, and is not repeatedly described herein.

Operation 504 searches a corresponding forwarding table based on a first destination IP address in the detection message.

In implementations, if the detection message is directly sent from the controller 100 to VTEP106, the detection message includes a first source IP address (the device IP address of VTEP106 as shown in FIG. 1) on a detected link, a first destination IP address (the device IP address of VTEP112 as shown in FIG. 1), and a first identifier of the detection message. In implementations, if VTEP106 receives the detection message from the controller 100, this indicates that VTEP106 is a starting point device of the detected link.

Operation 506 performs VXLAN encapsulation for the detection message based on a VXLAN network identifier and a destination VTEP address in the forwarding table.

In implementations, a VXLAN encapsulated detection message can be referenced to a message format that will be described in the following, and is not first described in detail herein.

Operation 508 labels the detection message in a VXLAN message header.

In implementations, a PD flag bit may be defined in a reserved field after a VNI field in a VXLAN header. When the PD flag bit is one, this indicates that a network message is a detection message.

Operation 510 determines whether the present network device has multiple equal-cost next jumps. Operation 512 is performed if multiple next jumps exist. Operation 514 is performed if only one next jump exists.

In implementations, a number of at least one next jump can be determined using a number of exit ports of the network device.

Operation 512 replicates the detection message according to the number of equal-cost next jumps.

Operation 514 encapsulates a corresponding MAC header for each detection message, and forwards the detection message to the next jump.

In implementations, an encapsulated MAC header can be referenced to a message format that will be described in the following, and is not first described herein in detail.

In the present embodiment, VTEP106 replicates a detection message that comes from a controller according to a number of at least one next jump, thus ensuring that the detection message can be sent to all paths on a detected link, and achieving a traversal of all the paths corresponding to VTEP106 on the detected link. This enables the controller to know link status information of the paths corresponding to the VTEP106.

Figure 6:
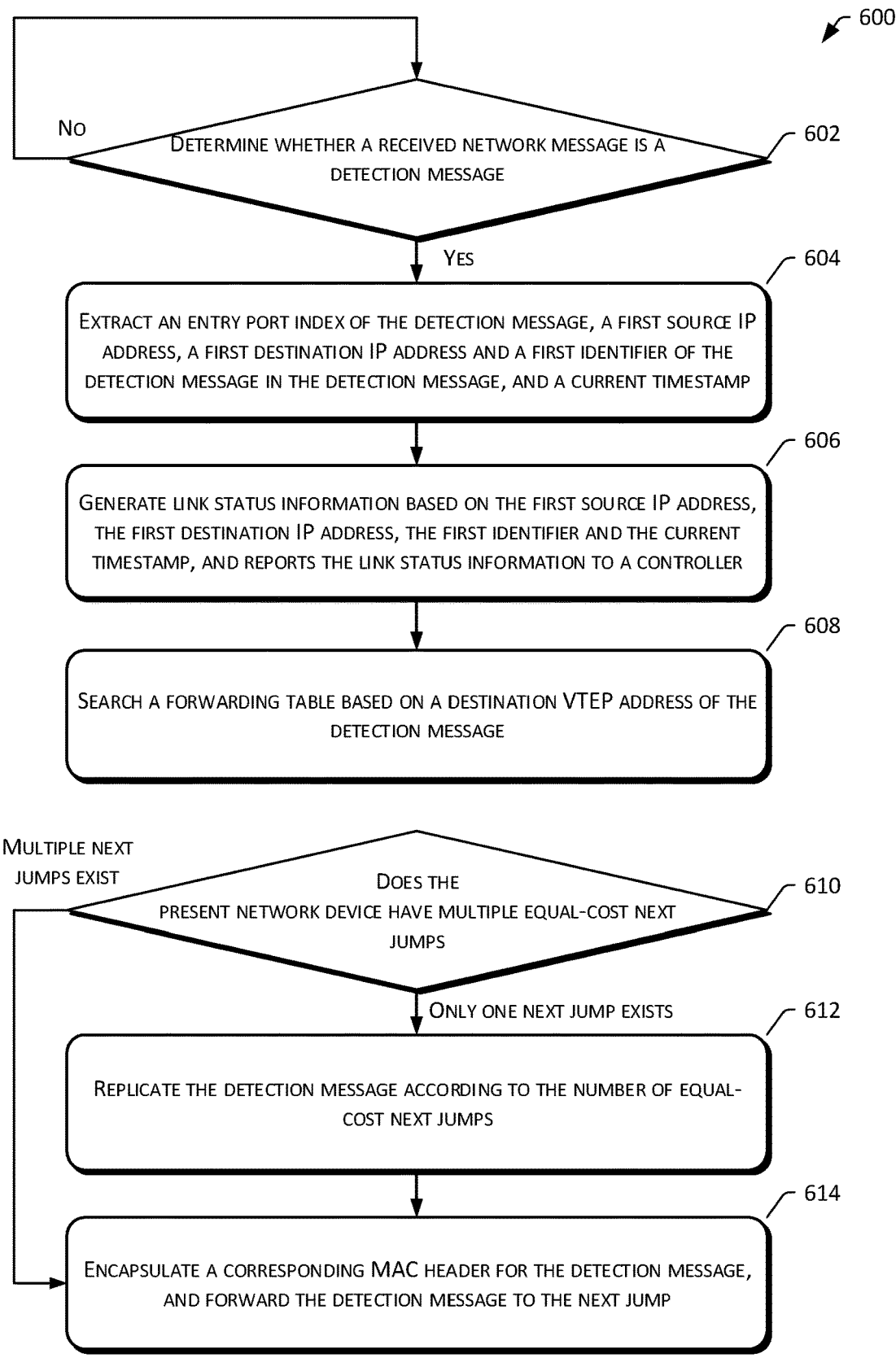
FIG. 6 is a flowchart of a link detection method in accordance with a fifth exemplary embodiment of the present disclosure.

FIG. 6 is a flowchart of a link detection method 600 in accordance with a fifth exemplary embodiment of the present disclosure. The present embodiment is illustrated and described in conjunction with FIG. 1 and an example of implementing detection message forwarding by the L3 device 108. As shown in FIG. 6, the following operations are included.

Operation 602 determines whether a received network message is a detection message. Operation 604 is performed if the network message is a detection message. If the network message is an ordinary network message, operation 602 is performed again.

Detailed description of operation 602 can be referenced to the description of operation 402, and is not repeatedly described herein.

Operation 604 extracts an entry port index of the detection message, a first source IP address, a first destination IP address and a first identifier of the detection message in the detection message, and a current timestamp.

Operation 606 generates link status information based on the first source IP address, the first destination IP address, the first identifier and the current timestamp, and reports the link status information to a controller.

Operation 608 searches a forwarding table based on a destination VTEP address of the detection message.

In implementations, a method of searching a forwarding table using a destination VTEP address can be referenced to a related description in existing technologies, and is not described in detail herein.

Operation 610 queries whether the present network device has multiple equal-cost next jumps based on the destination VTEP address of the detection message. Operation 612 is performed if multiple next jumps exist. If only one next jump exists, operation 614 is performed.

In implementations, next jump(s) can be found based on a destination VTEP address. The number of next jumps can be used for determining whether the detection message is needed to be replicated, and how many replications of the detection message are needed.

Operation 612 replicates the detection message according to the number of equal-cost next jumps.

Operation 614 encapsulates a corresponding MAC header for the detection message, and forwards the detection message.

In implementations, an encapsulated MAC header can be referenced to a message format that will be described in the following, and is not described herein in detail first.

In the present embodiment, a L3 device can replicates a detection message that comes from a controller according to the number of at least one next jump, thus ensuring that the detection message can be sent to all paths on a detected link, and achieving a traversal of all the paths corresponding to the L3 device on the detected link. This enables the controller to know link status information of the paths corresponding to the L3 device.

Figure 7:
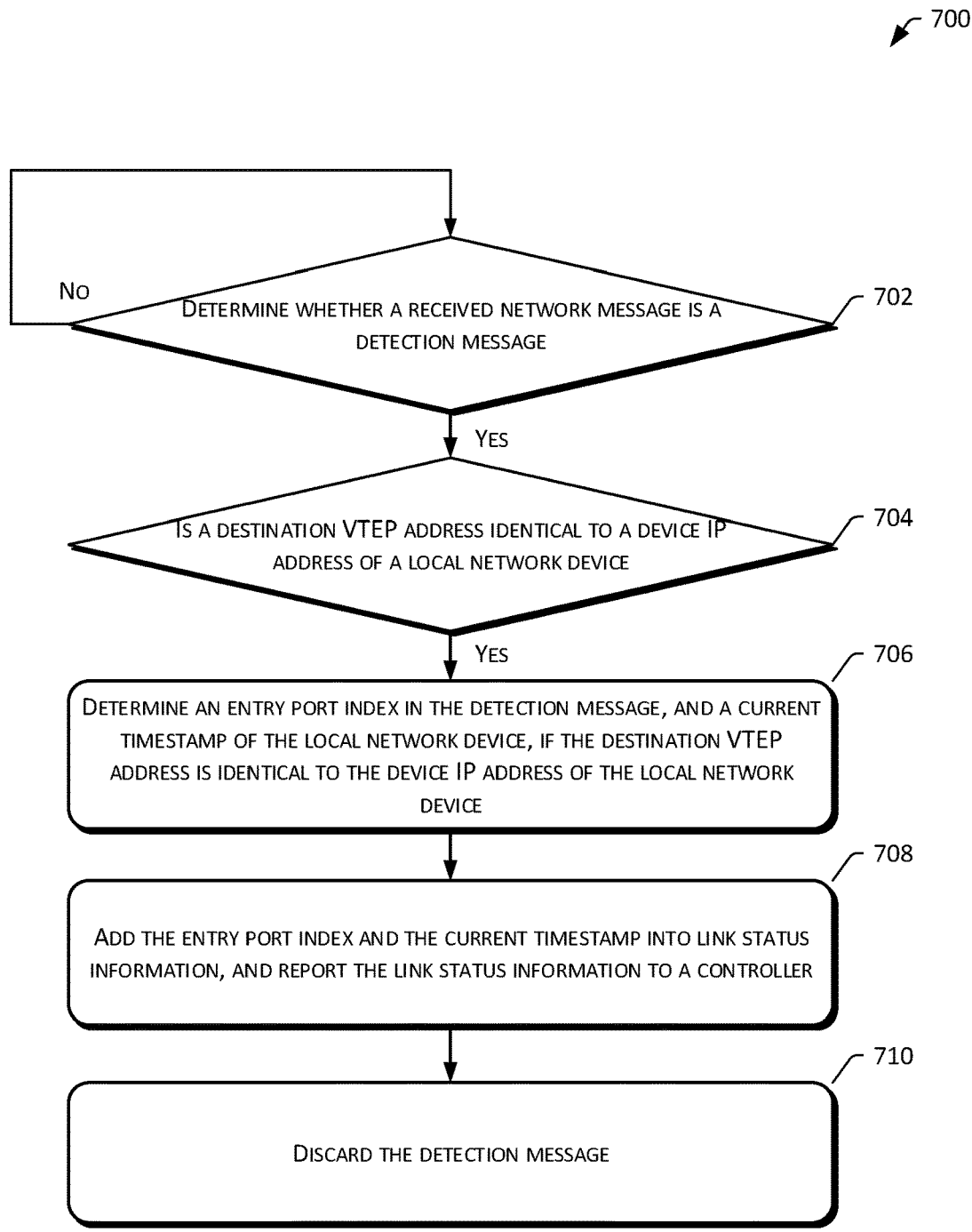
FIG. 7 is a flowchart of a link detection method in accordance with a sixth exemplary embodiment of the present disclosure.

FIG. 7 is a flowchart of a link detection method 700 in accordance with a sixth exemplary embodiment of the present disclosure.

The present embodiment is illustrated and described in conjunction with FIG. 1 and an example of terminating detection message forwarding by VTEP112. As shown in FIG. 7, the following operations are included.

Operation 702 determines whether a received network message is a detection message. Operation 704 is performed if the network message is a detection message. If the network message is an ordinary network message, operation 702 is performed again.

Detailed description of operation 702 can be referenced to the description of operation 402. How to parse a first destination IP address that is encapsulated in an outer message of a detection message from the detection message is not repeatedly described herein.

Operation 704 determines whether a destination VTEP address is identical to a device IP address of a local network device. Operation 706 is performed if the destination VTEP address is identical to the device IP address of the local network device. If the destination VTEP address is different from the device IP address of the local network device, a method of the embodiment of FIG. 6 can be referenced to forward to the detection message, which is not repeatedly described herein.

Operation 706 determines an entry port index in the detection message, and a current timestamp of the local network device, if the destination VTEP address is identical to the device IP address of the local network device.

Operation 708 adds the entry port index and the current timestamp into link status information, and reports the link status information to a controller.

Operation 710 discards the detection message.

In the present embodiment, after receiving a detection message, an ending point network device discards the detection message, thereby implementing a link detection of a all paths traversed on a detected link, and solving the deficiency of the existing technologies regarding a failure of path traversal.

Figure 8A:
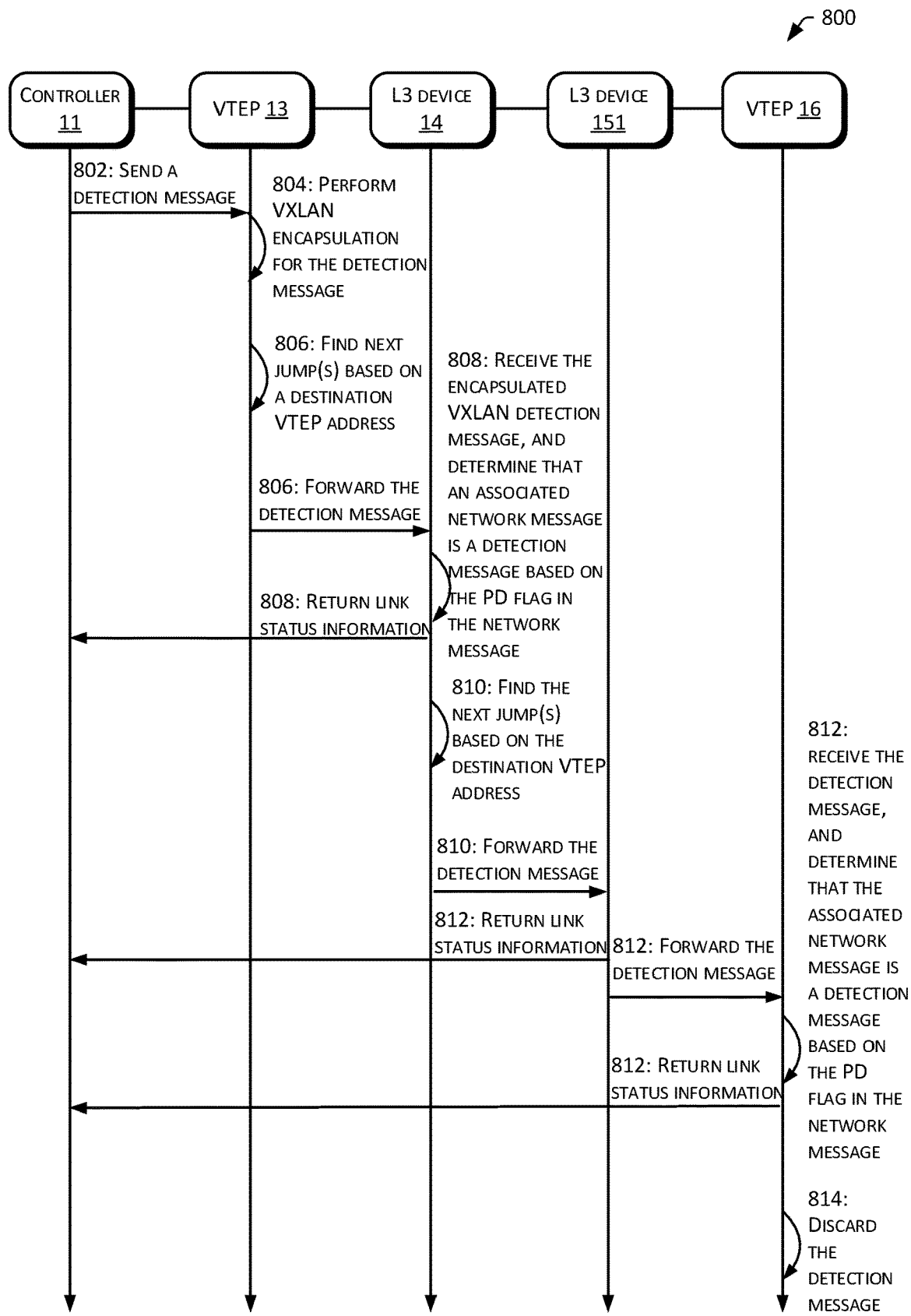
FIG. 8A is a flowchart of signaling among systems in accordance with a seventh exemplary embodiment of the present disclosure.

FIG. 8A is a flowchart of signaling 800 among various systems in accordance with a seventh exemplary embodiment of the present disclosure. An example of how the controller 100 detects a status of a link between VM102 and VM104 is used for illustration and description. As shown in FIG. 8, the following operations are included.

Operation 802: The controller 100 sends a detection message to VTEP106 of a VXLAN tunnel for which a link detection is needed to be performed. If a link detection in one direction is needed only, a detection message can be sent only to VTEP106 at a starting point of this direction. If a link detection in both directions is needed, detection messages are sent to VTEPs at both ends of the tunnel.

Operation 804: After receiving the detection message, VTEP106 searches a forwarding table based on a destination IP of the detection message, performs VXLAN encapsulation for the detection message based on information such as a destination VNI and a VTEP address (an IP address of VTEP112 in the present disclosure) in the forwarding table, and sets a PD flag in a VXLAN header as one.

Operation 806: VTEP106 looks up next jump(s) based on the destination VTEP address. If only one next jump exists, the message is directly sent to the next jump after encapsulating a MAC header. If multiple equal-cost next jumps exist, the detection message that has undergone VXLAN encapsulation is replicated according to the number of the next jumps. A MAC header of the message is encapsulated based on a MAC address of each next jump, and the encapsulated detection message is sent to each corresponding next jump. Details of the content of field(s) of a VXLAN header of an encapsulated VXLAN message can be found in a message format that will be described in the following.

Operation 808: The L3 device 108, which is a next jump of VTEP, receives the encapsulated VXLAN detection message, and reports link status information to the controller 100 after determining that an associated network message is a detection message based on the PD flag in the network message, the link status information including fields such as a timestamp, a message entry port, etc.

Operation 810: The L3 device 108 looks up next jump(s) based on the destination VTEP address in the message. If only one next jump exists, the message is directly sent to the next jump after encapsulating a MAC header. If multiple equal-cost next jumps exist, the detection message that has undergone VXLAN encapsulation is replicated according to the number of the next jumps. A MAC header of the message is encapsulated based on a MAC address of each next jump, and the detection message is sent to a next jump corresponding to the present L3 device, which is the L3 device 110-2. A handling process of the L3 device 110-2 is the same as the handling process of the L3 device 108, and is not repeatedly described in detail herein.

Operation 812: The ending point VTEP112 receives the detection message, and reports link status information after determining that the message is a detection message based on the PD flag in the message, the link status information including fields such as a timestamp, a message entry port, etc.

Operation 814: The ending point VTEP112 discards the detection message.

FIG. 8B is an exemplary format of a detection message as described with reference to FIG. 8A.

FIG. 8C is an exemplary format of a VXLAN header as described with reference to FIG. 8A.

A PD flag bit is defined in a reserved field after a field of VXLAN network identifier (which is abbreviated as VNI). When this PD flag bit is one, this indicates that an associated message is a detection message.

Figure 8D:
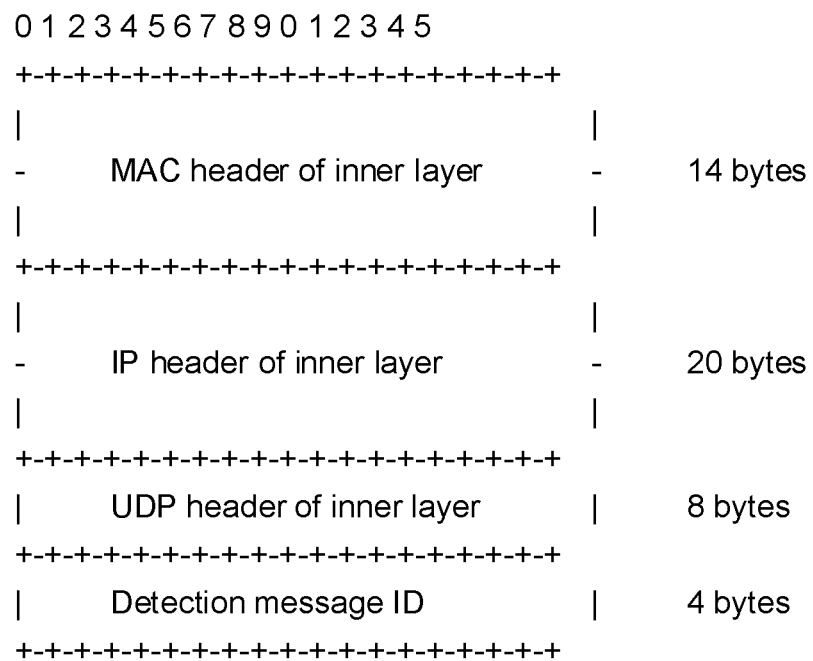
FIG. 8D is and an exemplary inner message format of a detection message as described with reference to FIG. 8A.

FIG. 8D is and an exemplary inner message format of a detection message as described with reference to FIG. 8A.

The controller 100 identifies a detection message based on a first source IP address, a first destination IP address and a detection message ID. Link status information that is reported to the controller 100 by an intermediate network device on a detected link includes the first source IP address and the first destination IP address of the detection message, a second destination IP address, and ID information of the detection message, thereby helping the controller to correspond the detected link with the detection message, and to locate the network device on the detected link based on a device IP address.

Through the above embodiments, the controller is responsible for constructing a detection message, and sending the detection message to a link starting point (e.g., VTEP106 as shown in FIG. 1) and intermediate network nodes (e.g., the L3 device 108, the L3 device 110-2 and the L3 device 110-22 as shown in FIG. 1) on a detected link, which individually look up corresponding forwarding tables thereof to forward the detection message to a link ending point (e.g., VTEP112 as shown in FIG. 1) jump after jump. Furthermore, each node reports respective link status information to the controller, and the controller records a status of the detected link. If a forwarding table of the link starting point or any intermediate network node on the detected link has multiple equal-cost paths, the detection message is replicated according to the number of next jumps thereof, and forwarded to the corresponding paths. Therefore, the present disclosure can traverse all paths on a detected link.

Figure 9:
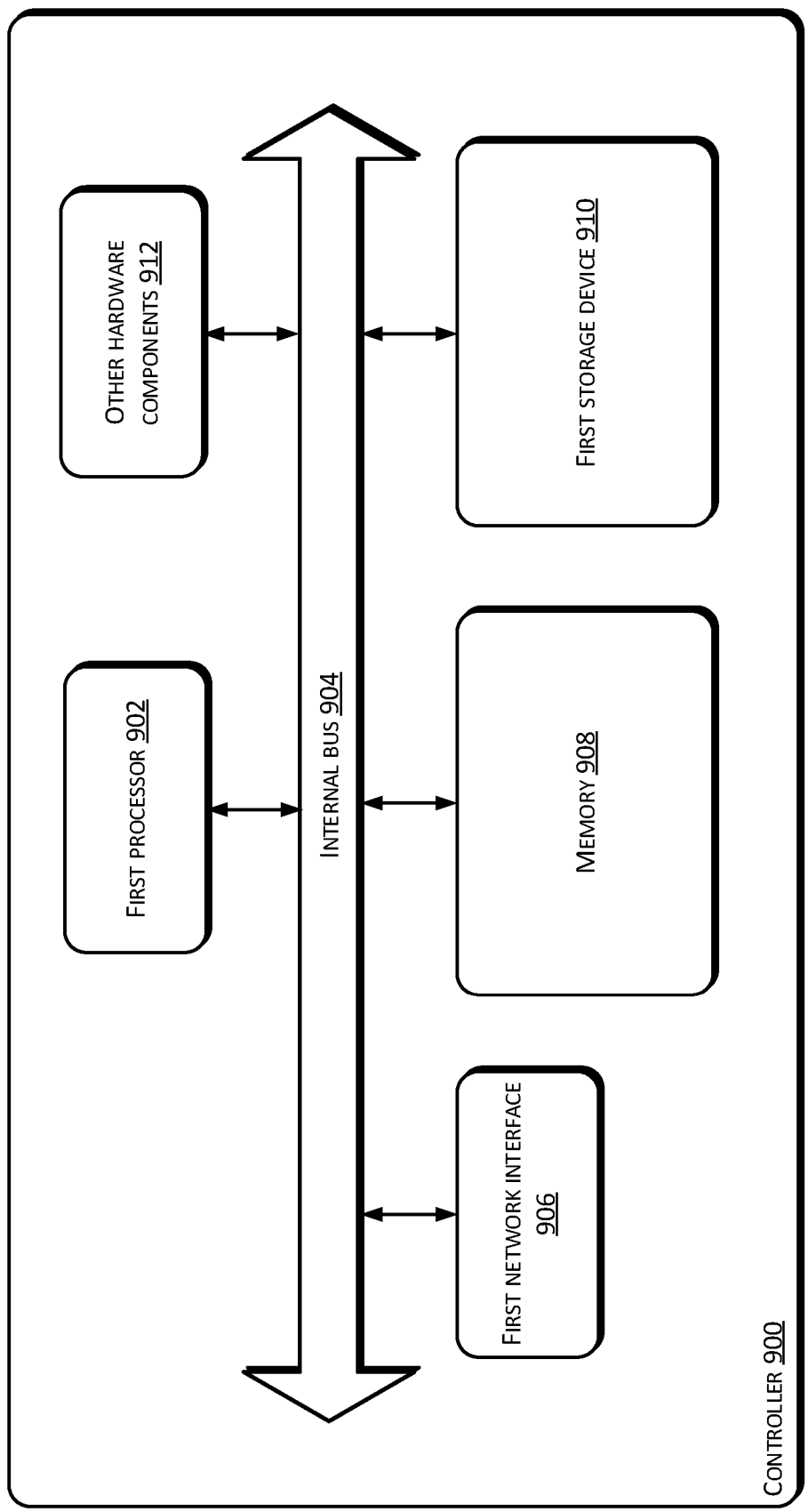
FIG. 9 is a schematic structural diagram of a controller in accordance with an exemplary embodiment of the present disclosure.

For the above link detection methods, the present disclosure also proposes a schematic structural diagram of a controller 900 in accordance with an exemplary embodiment of the present disclosure as shown in FIG. 9. Referring to FIG. 9, the controller 900 includes a first processor 902, an internal bus 904, a first network interface 906, memory 908, and a first storage device 910 storing instructions executable by the first processor 902 at a hardware layer. Apparently, hardware components 912 that are needed by other services may also be included.

The memory 908 may include a form of computer readable media such as a volatile memory, a random access memory (RAM) and/or a non-volatile memory, for example, a read-only memory (ROM) or a flash RAM. The memory 908 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The first network interface 906 is used for sequentially sending a detection message from a starting network device to each network device until an ending network device on a detected link, the detection message including a first source IP address and a first destination IP address on the detected link, and a first identifier of the detection message; and receiving link status information reported by a network device on the detected link in response to the detection message, the link status information including the first source IP address, the first destination IP address, a device IP address of the network device, and the first identifier.

The first processor 902 is used for performing a matching between the detection message and the detected link based on the first source IP address, the first destination IP address and the first identifier included in the link status information, and locating a network position of the network device on the detected link based on the device IP address.

Figure 10:
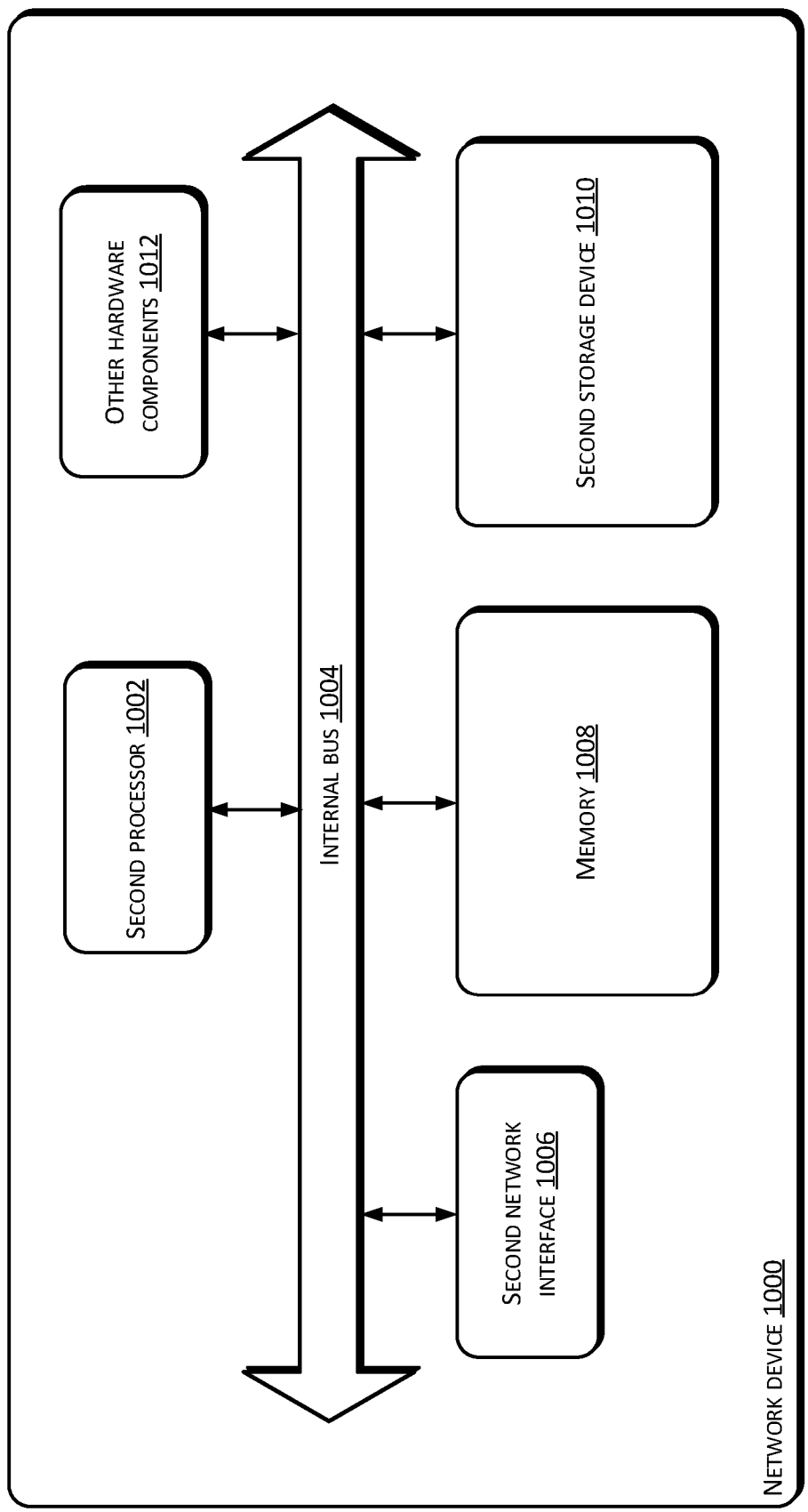
FIG. 10 is a schematic structural diagram of a network device in accordance with an exemplary embodiment of the present disclosure.

For the above link detection methods, the present disclosure also proposes a schematic structural diagram of a network device 1000 in accordance with an exemplary embodiment of the present disclosure as shown in FIG. 10. Referring to FIG. 10, the network device 1000 includes a second processor 1002, an internal bus 1004, a second network interface 1006, memory 1008, and a second storage device 1010 storing instructions executable by the second processor at a hardware layer. Apparently, hardware components 1012 that are needed by other services may also be included. The memory 1008 may include a form of computer readable media as the one described in the foregoing description.

The second processor 1002 is used for determining whether a received network message is a detection message; generating link status information based on a first source IP address and a first destination IP address included in the detection message, a device IP address of the network device, and a first identifier of the detection message, and reporting the link status information to a controller through the second interface 1006, if the network message is a detection message; searching a forwarding table of the network device based on the first destination IP address, and replicating the detection message according to a number of at least one next jump of the network device if the at least one next jump exists in the forwarding table; and encapsulating a MAC header of the detection message based on a MAC address of each next jump of the at least one next jump, and transmitting the detection message to the at least one next jump through the second interface 1006.

Figure 11:
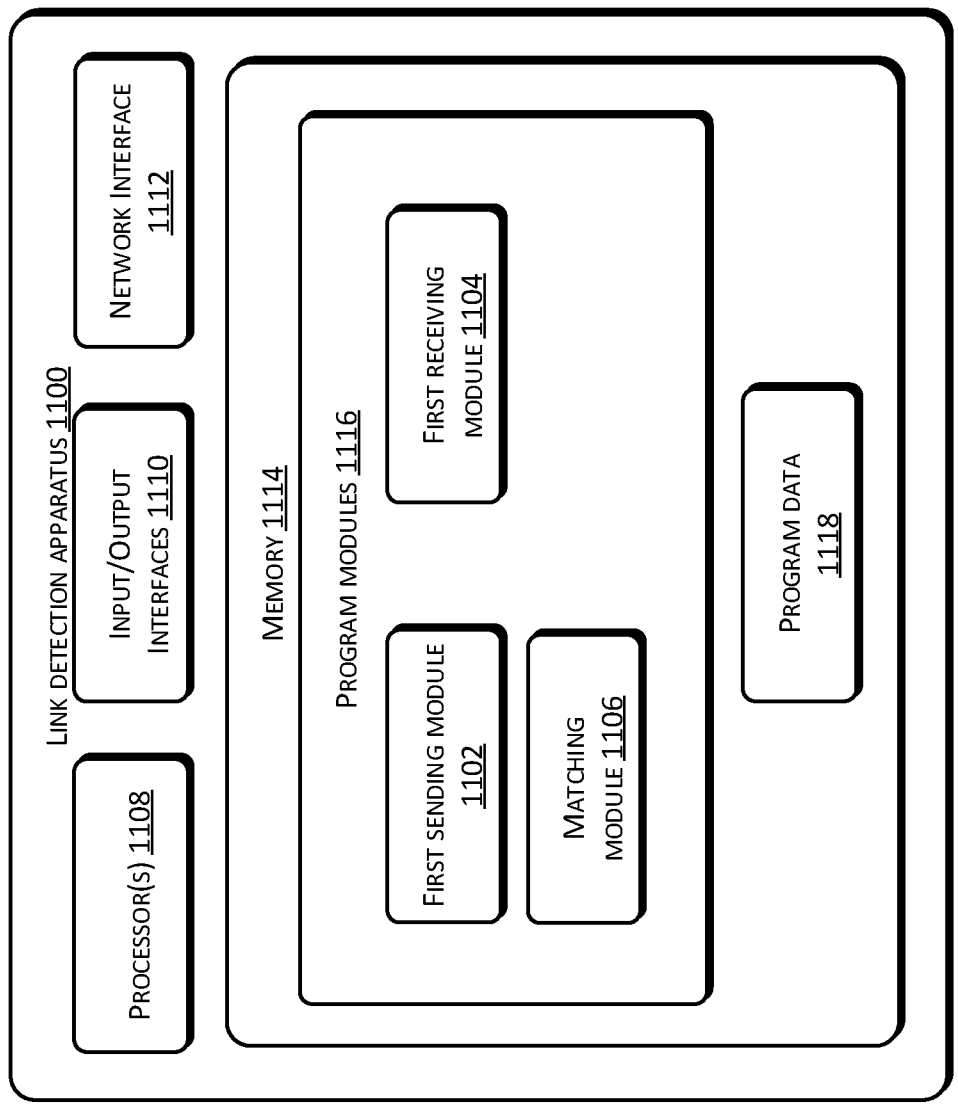
FIG. 11 is a schematic structural diagram of a link detection apparatus in accordance with a first exemplary embodiment of the present disclosure.

FIG. 11 is a schematic structural diagram of a link detection apparatus 1100 in accordance with a first exemplary embodiment of the present disclosure. In implementations, the link detection apparatus 1100 may include one or more computing devices. In implementations, the link detection apparatus 1100 may be implemented by one or more computing devices, or may be a part of one or more computing devices located at a single place or distributed among a plurality of network devices that are connected through a network (e.g., a cloud computing architecture, etc.). By way of example and not limitation, as shown in FIG. 11, the link detection apparatus 1100 may include a first sending module 1102, a first receiving module 1104, and a matching module 1106.

The first sending module 1102 is used for sequentially sending a detection message from a starting network device to each network device until an ending network device on a detected link, the detection message including a first source IP address and a first destination IP address on the detected link, and a first identifier of the detection message.

The first receiving module 1104 is used for receiving link status information reported by a network device on the detected link in response to the detection message that is sent by the first sending module, the link status information including the first source IP address, the first destination IP address, a device IP address of the network device, and the first identifier.

The matching module 1106 is used for performing a matching between the detection message and the detected link based on the first source IP address, the first destination IP address and the first identifier included in the link status information that is received by the first receiving module, and locating a network position on the detected link in which the network device is located based on the device IP address.

In implementations, the link detection apparatus 1100 may further include one or more processors 1108, an input/output interface 1110, a network interface 1112, and memory 1114. The memory 1114 may include a form of computer readable media as the one described in the foregoing description. In implementations, the memory 1114 may include program modules 1116 and program data 1118. The program modules 1116 may include one or more of the foregoing modules as shown in FIG. 11.

Figure 12:
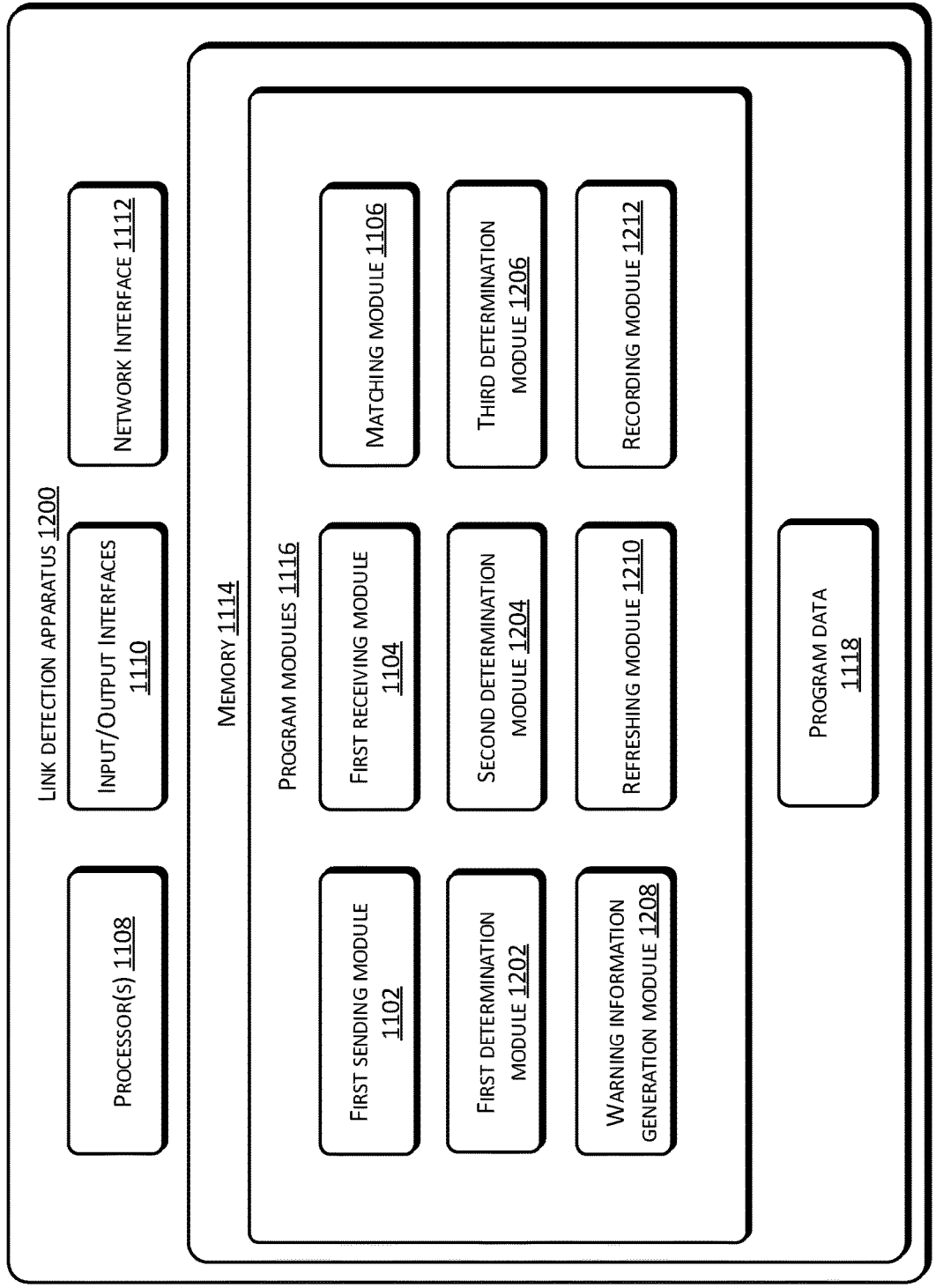
FIG. 12 is a schematic structural diagram of a link detection apparatus in accordance with a second exemplary embodiment of the present disclosure.

FIG. 12 is a schematic structural diagram of a link detection apparatus 1200 in accordance with a second exemplary embodiment of the present disclosure. In implementations, the link detection apparatus 1200 may include one or more computing devices. In implementations, the link detection apparatus 1200 may be implemented by one or more computing devices, or may be a part of one or more computing devices located at a single place or distributed among a plurality of network devices that are connected through a network (e.g., a cloud computing architecture, etc.). By way of example and not limitation, as shown in FIG. 12, on a basis of the embodiment shown in FIG. 11, the apparatus 1200 may further include a first determination module 1202 used for determining a timestamp of link status information of any one network device on the detected link that is received by the first receiving module 1104; a second determination module 1204 used for determining whether link status information is reported by a next-jump network device of the any one network device is received within a defined time period after the timestamp; a third determination module 1206 used for determining a device IP address of the next-jump network device if the second determination module 1204 determines that no link status information of the next-jump network device is received within the defined time period; and a warning information generation module 1208 used for generating warning information indicating an existence of a failed link in the detected link based on the device IP address of the next-jump network device determined by the third determination module 1206.

In implementations, the apparatus may further include a refreshing module 1210 used for refreshing a forwarding table of the present network device based on the device IP address of the next-jump network device that is determined by the third determination module 1206, to enable the present network device to stop sending network messages to the failed link based on the refreshed forwarding table.

In implementations, the apparatus may further include a recording module 1212 used for recording the link status information that is determined by the second determination module 1204 into a corresponding node of a topological structural map that is maintained by a controller.

Figure 13:
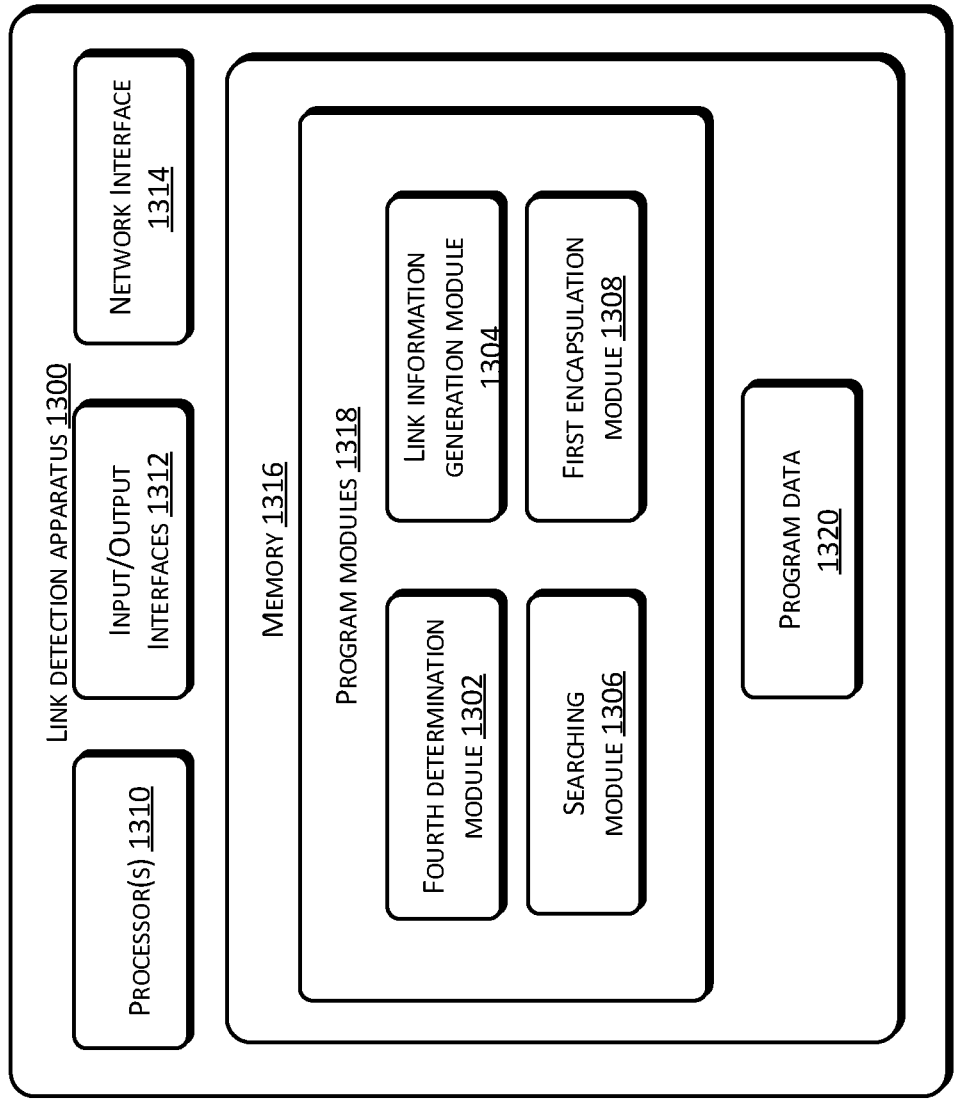
FIG. 13 is a schematic structural diagram of a link detection apparatus in accordance with a third exemplary embodiment of the present disclosure.

FIG. 13 is a schematic structural diagram of a link detection apparatus 1300 in accordance with a third exemplary embodiment of the present disclosure. In implementations, the link detection apparatus 1300 may include one or more computing devices. In implementations, the link detection apparatus 1300 may be implemented by one or more computing devices, or may be a part of one or more computing devices located at a single place or distributed among a plurality of network devices that are connected through a network (e.g., a cloud computing architecture, etc.). By way of example and not limitation, as shown in FIG. 13, the link detection apparatus 1300 may include a fourth determination module 1302, a link information generation module 1304, a searching module 1306, and a first encapsulation module 1308.

The fourth determination module 1302 is used for determining whether a received network message is a detection message.

The link information generation module 1304 is used for generating link status information based on a first source IP address and a first destination IP address included in the detection message, a device IP address of the network device, and a first identifier of the detection message, and reporting the link status information to a controller, if the fourth determination module 1302 determines that the network message is the detection message.

The searching module 1306 is used for parsing a destination VTEP address from the detection message that is determined by the fourth determination module 1302, searching a forwarding table of the network device based on the destination VTEP address, and replicating the detection message according to a number of at least one next jump of the network device if the at least one next jump exists in the forwarding table.

The first encapsulation module 1308 is used for encapsulating a MAC header of the detection message based on a MAC address of each next jump of the at least one next jump that is found by the searching module 1306, and transmitting the detection message to the at least one next jump.

In implementations, the link detection apparatus 1300 may further include one or more processors 1310, an input/output interface 1312, a network interface 1314, and memory 1316. The memory 1316 may include a form of computer readable media as the one described in the foregoing description. In implementations, the memory 1316 may include program modules 1318 and program data 1320. The program modules 1318 may include one or more of the foregoing modules as shown in FIG. 13.

Figure 14:
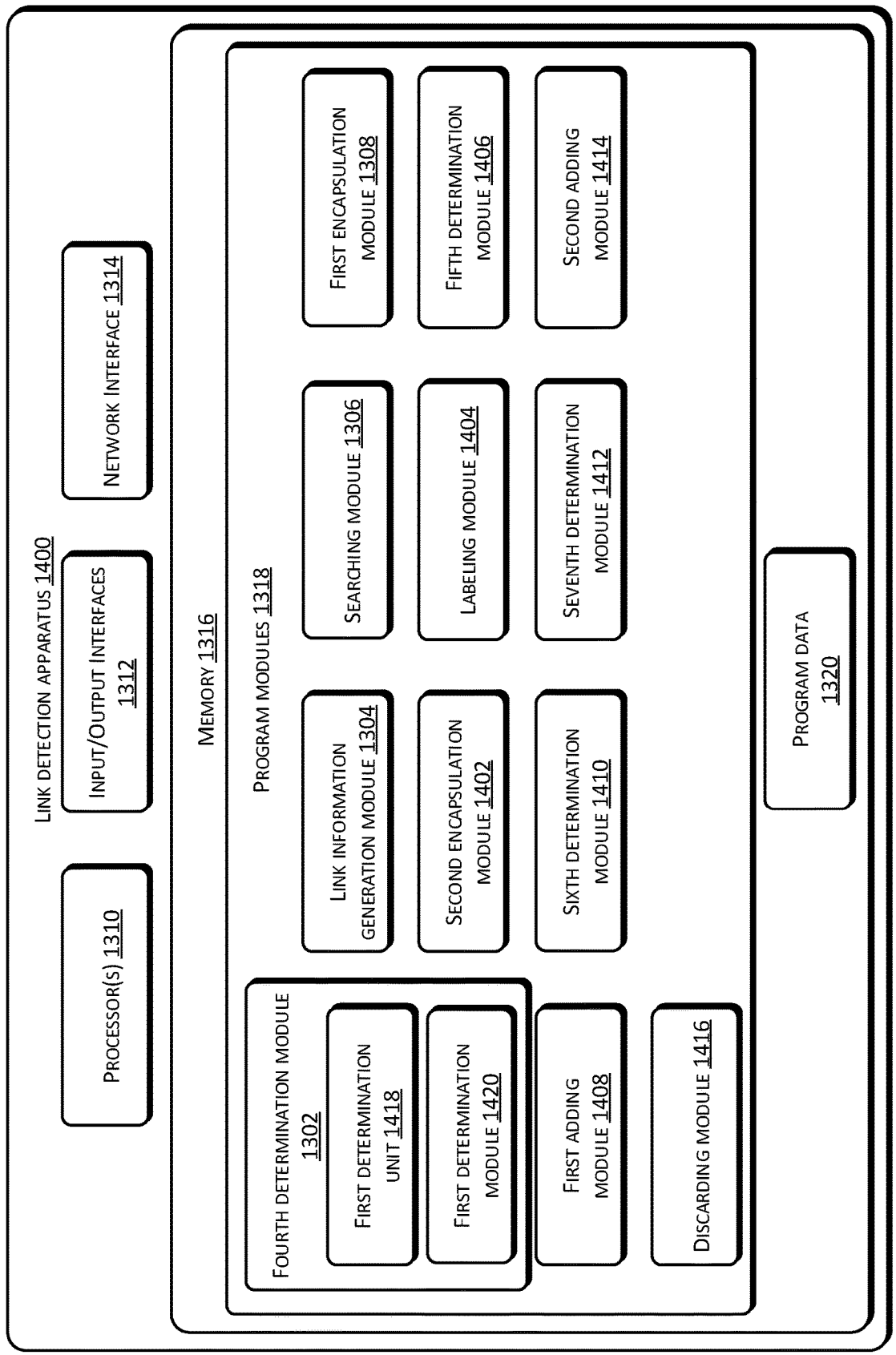
FIG. 14 is a schematic structural diagram of a link detection apparatus in accordance with a fourth exemplary embodiment of the present disclosure.

FIG. 14 is a schematic structural diagram of a link detection apparatus 1400 in accordance with a fourth exemplary embodiment of the present disclosure. In implementations, the link detection apparatus 1400 may include one or more computing devices. In implementations, the link detection apparatus 1400 may be implemented by one or more computing devices, or may be a part of one or more computing devices located at a single place or distributed among a plurality of network devices that are connected through a network (e.g., a cloud computing architecture, etc.). By way of example and not limitation, as shown in FIG. 14, on a basis of the embodiment shown in FIG. 13, the apparatus 1400 may further include a second encapsulation module 1402 used for performing a VXLAN encapsulation for the detection message based on a destination VXLAN network identifier and the destination VTEP address in the forwarding table that is found by the searching module 1306; and a labeling module 1404 used for labeling the detection message in a VXLAN header. The searching module 1306 performs the operation of searching the forwarding table of the network device based on the first destination IP address of the detection message.

In implementations, if the detection message is forwarded by a network device on the detected link, the apparatus may further include a fifth determination module 1406 used for determining an entry port index in the detection message that is determined by the fourth determination module 1302 and a current timestamp of a local network device; and a first adding module 1408 used for adding the entry port index and the current timestamp that are determined by the fifth determination module 1406 into the link status information.

In implementations, the apparatus may further include a sixth determination module 1410 used for determining whether the destination VTEP address is identical to an IP address of a local network device; a seventh determination module 1412 used for determining an entry port index in the detection message and a current timestamp of the local network device if the sixth determination module 1410 determines that the destination VTEP address is identical to the IP address of the local network device; and a second adding module 1414 used for adding the entry port index and the current timestamp that are determined by the seventh determination module 1412 into the link status information.

In implementations, the apparatus may further include a discarding module 1416 used for discarding the detection message that is determined by the fourth determination module 1302.

In implementations, the fourth determination module 1302 may include a first determination unit 1418 used for determining a flag in a VXLAN message header in the received network message; and a second determination unit 1420 used for determining whether the network message is the detection message based on the flag in the VXLAN message header that is determined by the first determination unit 1418.

As can be seen from the above embodiments, a controller is responsible for constructing a detection message, and sending the detection message to a link starting point and intermediate network nodes on a detected link, which individually look up corresponding forwarding tables thereof to forward the detection message to a link ending point jump after jump. Furthermore, each node reports respective link status information to the controller, and the controller records a status of the detected link. If a forwarding table of the link starting point or any intermediate network node on the detected link has multiple equal-cost paths, the detection message is replicated according to the number of next jumps thereof, and forwarded to the corresponding paths. Therefore, the present disclosure can traverse all paths on a detected link.

After considering the specification and implementing the invention disclosed herein, one skilled in the art can easily think of other implementation solutions of the present disclosure. The present disclosure is intended to cover any modifications, uses or adaptive changes of the present disclosure. These modifications, uses or adaptive changes follow general principles of the present disclosure, and include well-known knowledge or common technical measures in the present technical field that are not described in the present disclosure. The specification and the embodiments are merely considered as illustrative. The true scope and spirit of the present disclosure are indicated by the appended claims.

It should also be noted that terms such as "include", "contain" or any other variations are intended to cover non-exclusive inclusion, such as a process, method, product or device that includes a series of elements not only includes these elements, but also includes other elements that are not explicitly listed, or also includes elements that are inherent in the process, method, product or device. Without any further limitation, an element defined by a phrase "include a . . . " does not prevent the process, method, product or device to further include additional element(s) that is/are identical thereto.

The above description is merely exemplary embodiments of the present disclosure, which are not construed as limitations to the present disclosure. All modifications, equivalent replacements and improvements, etc., that are made within the spirit and the principles of the present disclosure are included in the scope of protection of the present disclosure.

The present disclosure may be further understood with clauses as follows.

Clause 1: A link detection method, which is applied in a controller, wherein the method comprises: sequentially sending a detection message from a starting network device to each network device until an ending network device on a detected link, the detection message including a first source IP address and a first destination IP address on the detected link, and a first identifier of the detection message; receiving link status information reported by a network device on the detected link in response to the detection message, the link status information including the first source IP address, the first destination IP address, a device IP address of the network device, and the first identifier; and performing a matching between the detection message and the detected link based on the first source IP address, the first destination IP address and the first identifier included in the link status information, and locating a network position on the detected link in which the network device is located based on the device IP address.

Clause 2: The method of Clause 1, wherein the method further comprises: determining a timestamp of link status information of any one network device on the detected link; determining whether link status information reported by a next-jump network device of the any one network device on the detected link is received within a defined time period after the timestamp; determining a device IP address of the next-jump network device if no link status information of the next-jump network device is received within the defined time period; and generating warning information indicating an existence of a failed link in the detected link based on the device IP address of the next-jump network device.

Clause 3: The method of Clause 2, wherein the method further comprises refreshing a forwarding table of a present network device based on the device IP address of the next-jump network device, so that the present network device stops sending network messages to the failed link based on the refreshed forwarding table.

Clause 4: The method of Clause 1, wherein the method further comprises recording the link status information into a corresponding node of a topological structural map that is maintained by the controller.

Clause 5: A link detection method, which is applied in a network device, wherein the method comprises: determining whether a received network message is a detection message; if the network message is a detection message, generating link status information based on a first source IP address and a first destination IP address included in the detection message, a device IP address of the network device, and a first identifier of the detection message, and reporting the link status information to a controller; parsing a destination VTEP address from the detection message, searching a forwarding table of the network device based on the destination VTEP address, and replicating the detection message according to a number of at least one next jump of the network device if the at least one next jump exists in the forwarding table; and encapsulating a MAC header of the detection message based on a MAC address of each next jump of the at least one next jump, and transmitting the detection message to the at least one next jump.

Clause 6: The method of Clause 5, wherein: if the detection message is sent directly from the controller, the method further comprises: performing a VXLAN encapsulation for the detection message based on a destination VXLAN network identifier and the destination VTEP address in the forwarding table; and labeling the detection message in a VXLAN header, and performing the searching of the forwarding table of the network device based on the destination VTEP address of the detection message.

Clause 7: The method of Clause 5, wherein: if the detection message is forwarded by a network device on the detected link, the method further comprises: determining an entry port index in the detection message and a current timestamp of a local network device; and adding the entry port index and the current timestamp into the link status information.

Clause 8: The method of Clause 5, wherein the method further comprises: determining whether the destination VTEP address is identical to a device IP address of a local network device; determining an entry port index in the detection message and a current timestamp of a local network device if the destination VTEP address is identical to the device IP address of a local network device; and adding the entry port index and the current timestamp into the link status information.

Clause 9: The method of Clause 8, wherein the method further comprises discarding the detection message.

Clause 10: The method of Clause 5, wherein determining whether the received network message is the detection message comprises: determining a flag in a VXLAN header in the received network message; and determining whether the network message is the detection message based on the flag in the VXLAN header.

Clause 11: A link detection apparatus, which is applied in a controller, wherein the link detection apparatus comprises: a first sending module used for sequentially sending a detection message from a starting network device to each network device until an ending network device on a detected link, the detection message including a first source IP address and a first destination IP address on the detected link, and a first identifier of the detection message; a first receiving module used for receiving link status information reported by a network device on the detected link in response to the detection message that is sent by the first sending module, the link status information including the first source IP address, the first destination IP address, a device IP address of the network device, and the first identifier; and a matching module used for performing a matching between the detection message and the detected link based on the first source IP address, the first destination IP address and the first identifier included in the link status information that is received by the first receiving module, and locating a network position on the detected link in which the network device is located based on the device IP address.

Clause 12: The apparatus of Clause 11, wherein the apparatus further comprises: a first determination module used for determining a timestamp of link status information of any one network device on the detected link that is received by the first receiving module; a second determination module used for determining whether link status information is reported by a next-jump network device of the any one network device is received within a defined time period after the timestamp; a third determination module used for determining a device IP address of the next-jump network device if the second determination module determines that no link status information of the next-jump network device is received within the defined time period; and a warning information generation module used for generating warning information indicating an existence of a failed link in the detected link based on the device IP address of the next-jump network device determined by the third determination module.

Clause 13: The apparatus of Clause 12, wherein the apparatus further comprises a refreshing module used for refreshing a forwarding table of a present network device based on the device IP address of the next-jump network device that is determined by the third determination module, to enable the present network device to stop sending network messages to the failed link based on the refreshed forwarding table.

Clause 14: The apparatus of Clause 11, wherein the apparatus further comprises a recording module used for recording the link status information into a corresponding node of a topological structural map that is maintained by a controller.

Clause 15: A link detection apparatus, which is applied in a network device, wherein the apparatus comprises: a fourth determination module used for determining whether a received network message is a detection message; a link information generation module used for, if the fourth determination module determines that the network message is a detection message, generating link status information based on a first source IP address and a first destination IP address included in the detection message, a device IP address of the network device, and a first identifier of the detection message, and reporting the link status information to a controller; a searching module used for parsing a destination VTEP address from the detection message that is determined by the fourth determination module, searching a forwarding table of the network device based on the destination VTEP address, and replicating the detection message according to a number of at least one next jump of the network device if the at least one next jump exists in the forwarding table; and a first encapsulation module used for encapsulating a MAC header of the detection message based on a MAC address of each next jump of the at least one next jump that is found by the searching module, and transmitting the detection message to the at least one next jump.

Clause 16: The apparatus of Clause 15, wherein: if the detection message is directly sent from the controller, the apparatus further comprises: a second encapsulation module used for performing a VXLAN encapsulation for the detection message based on a destination VXLAN network identifier and the destination VTEP address in the forwarding table; and a labeling module used for labeling the detection message in a VXLAN header, wherein the searching module performs the searching of the forwarding table of the network device based on the first destination IP address of the detection message.

Clause 17: The apparatus of Clause 15, wherein: if the detection message is forwarded by a network device on the detected link, the apparatus further comprises: a fifth determination module used for determining an entry port index in the detection message and a current timestamp of a local network device; and a first adding module used for adding the entry port index and the current timestamp into the link status information.

Clause 18: The apparatus of Clause 15, wherein the apparatus further comprises: a sixth determination module used for determining whether the destination VTEP address is identical to an IP address of a local network device; a seventh determination module used for determining an entry port index in the detection message and a current timestamp of the local network device if the sixth determination module determines that the destination VTEP address is identical to the IP address of the local network device; and a second adding module used for adding the entry port index and the current timestamp that are determined by the seventh determination module into the link status information.

Clause 19: The apparatus of Clause 18, wherein the apparatus further comprises a discarding module used for discarding the detection message that is determined by the fourth determination module.

Clause 20: The apparatus of Clause 15, wherein the further determination module comprises: a first determination unit used for determining a flag in a VXLAN message header in the received network message; and a second determination unit used for determining whether the network message is the detection message based on the flag in the VXLAN message header that is determined by the first determination unit.

Clause 21: A controller comprising: a first processor, a first storage device storing instructions executable by the first processor, and a first network interface, wherein: the first network interface is used for sequentially sending a detection message from a starting network device to each network device until an ending network device on a detected link, the detection message including a first source IP address and a first destination IP address on the detected link, and a first identifier of the detection message; and receiving link status information reported by a network device on the detected link in response to the detection message, the link status information including the first source IP address, the first destination IP address, a device IP address of the network device, and the first identifier; and the first processor is used for performing a matching between the detection message and the detected link based on the first source IP address, the first destination IP address and the first identifier included in the link status information, and locating a network position on the detected link in which the network device is located based on the device IP address.

Clause 22. A network device, wherein the network device comprises: a second processor, a storage device storing instructions executable by the second processor, and a second network interface, wherein the second processor is used for determining whether a received network message is a detection message; generating link status information based on a first source IP address and a first destination IP address included in the detection message, a device IP address of the network device, and a first identifier of the detection message, and reporting the link status information to a controller through the second interface, if the network message is a detection message; searching a forwarding table of the network device based on the first destination IP address, and replicating the detection message according to a number of at least one next jump of the network device if the at least one next jump exists in the forwarding table; and encapsulating a MAC header of the detection message based on a MAC address of each next jump of the at least one next jump, and transmitting the detection message to the at least one next jump through the second interface.

What is claimed is:

1. A method comprising:
sequentially sending a detection message from a starting network device to each network device up to an ending network device on a detected link, the detection message including a first source IP address and a first destination IP address on the detected link, and a first identifier of the detection message, detection messages having respective first identifiers different from each other;
receiving link status information reported by a first network device on the detected link in response to the detection message, the link status information including the first source IP address, the first destination IP address, a device IP address of the network device, and the first identifier;
performing a matching between the detection message and the detected link based on the first source IP address, the first destination IP address and the first identifier included in the link status information; and
locating a network position of the first network device on the detected link based on the device IP address.

2. The method of claim 1, further comprising:
determining a timestamp of link status information of a second network device on the detected link; and
determining whether link status information reported by a next-jump network device of the second network device on the detected link is received within a defined time period after the timestamp.

3. The method of claim 2, further comprising:
determining a device IP address of the next-jump network device if no link status information of the next-jump network device is received within the defined time period; and
generating warning information indicating an existence of a failed link in the detected link based on the device IP address of the next-jump network device.

4. The method of claim 3, further comprising refreshing a forwarding table of the second network device based on the device IP address of the next-jump network device, so that the second network device stops sending network messages to the failed link based on the refreshed forwarding table.

5. The method of claim 1, wherein the method further comprises recording the link status information into a corresponding node of a topological structural map that is maintained by a controller.

6. The method of claim 1, further comprising sending detection messages to network devices on the detected link intermittently.

7. One or more computer readable media storing executable instructions that, when executed by one or more processors of a first network device, cause the one or more processors to perform acts comprising:
determining whether a received network message is a detection message;
in response to determining that the network message is the detection message, generating link status information based on a first source IP address and a first destination IP address included in the detection message, a device IP address of the first network device, and a first identifier of the detection message, and reporting the link status information to a controller;
parsing a destination VTEP address from the detection message, searching a forwarding table of the first network device based on the destination VTEP address, and replicating the detection message according to a number of at least one next jump of the first network device if the at least one next jump exists in the forwarding table; and
encapsulating a MAC header of the detection message based on a MAC address of each next jump of the at least one next jump, and transmitting the detection message to the at least one next jump.

8. The one or more computer readable media of claim 7, wherein: if the detection message is sent directly from the controller, the acts further comprise:

performing a VXLAN encapsulation for the detection message based on a destination VXLAN network identifier and the destination VTEP address in the forwarding table; and labeling the detection message in a VXLAN header.

9. The one or more computer readable media of claim 7, wherein: if the detection message is forwarded by a second network device on the detected link, the acts further comprise:

determining an entry port index in the detection message and a current timestamp of the first network device; and adding the entry port index and the current timestamp into the link status information.

10. The one or more computer readable media of claim 7, the acts further comprising:

determining whether the destination VTEP address is identical to a device IP address of the first network device;

determining an entry port index in the detection message and a current timestamp of the first device if the destination VTEP address is identical to the device IP address of the first network device; and adding the entry port index and the current timestamp into the link status information.

11. The one or more computer readable media of claim 10, the acts further comprising discarding the detection message.

12. The one or more computer readable media of claim 7, wherein determining whether the received network message is the detection message comprises:

determining a flag in a VXLAN header in the received network message; and determining whether the network message is the detection message based on the flag in the VXLAN header.

13. The one or more computer readable media of claim 7, wherein the received network message is the detection message if the flag is one.

14. An apparatus implemented by a first network device comprising one or more processors and memory, the apparatus comprising:

a fourth determination module stored in the memory and executable by the one or more processor to determine whether a received network message is a detection message;

a link information generation module stored in the memory and executable by the one or more processor to, if the fourth determination module determines that the network message is a detection message, generate link status information based on a first source IP address and a first destination IP address included in the detection message, a device IP address of the first network device, and a first identifier of the detection message, and reporting the link status information to a controller;

a searching module stored in the memory and executable by the one or more processor to parse a destination VTEP address from the detection message that is determined by the fourth determination module, search a forwarding table of the network device based on the destination VTEP address, and replicate the detection message according to a number of at least one next jump of the first network device if the at least one next jump exists in the forwarding table; and a first encapsulation module stored in the memory and executable by the one or more processor to encapsulate a MAC header of the detection message based on a MAC address of each next jump of the at least one next jump that is found by the searching module, and transmitting the detection message to the at least one next jump.

15. The apparatus of claim 14, wherein: if the detection message is directly sent from the controller, the apparatus further comprises:

a second encapsulation module stored in the memory and executable by the one or more processor to perform a VXLAN encapsulation for the detection message based on a destination VXLAN network identifier and the destination VTEP address in the forwarding table; and a labeling module used stored in the memory and executable by the one or more processor to label the detection message in a VXLAN header.

16. The apparatus of claim 14, wherein: if the detection message is forwarded by a second network device on the detected link, the apparatus further comprises:

a fifth determination module stored in the memory and executable by the one or more processor to determine an entry port index in the detection message and a current timestamp of the first network device; and a first adding module stored in the memory and executable by the one or more processor to add the entry port index and the current timestamp into the link status information.

17. The apparatus of claim 14, further comprising:

a sixth determination module stored in the memory and executable by the one or more processor to determine whether the destination VTEP address is identical to an IP address of the first network device;

a seventh determination module stored in the memory and executable by the one or more processor to determine an entry port index in the detection message and a current timestamp of the first network device if the sixth determination module determines that the destination VTEP address is identical to the IP address of the first network device; and a second adding module stored in the memory and executable by the one or more processor to add the entry port index and the current timestamp that are determined by the seventh determination module into the link status information.

18. The apparatus of claim 17, further comprising a discarding module stored in the memory and executable by the one or more processor to discard the detection message that is determined by the fourth determination module.

19. The apparatus of claim 14, wherein the fourth determination module comprises:

a first determination unit used for determining a flag in a VXLAN message header in the received network message; and a second determination unit used for determining whether the network message is the detection message based on the flag in the VXLAN message header that is determined by the first determination unit.

20. The apparatus of claim 19, wherein the received network message is the detection message if the flag is one.

* * * * *